US012574300B2

(12) United States Patent     (10) Patent No.:   US 12,574,300 B2

Duan     (45) Date of Patent:   Mar. 10, 2026

(54) FEDERATED LEARNING GROUP PROCESSING METHOD, DEVICE AND FUNCTIONAL ENTITY

(71) Applicant: DATANG MOBILE COMMUNICATIONS EQUIPMENT CO., LTD., Beijing (CN)

(72) Inventor: Xiaoyan Duan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 96 days.

(21) Appl. No.: 18/692,769

(22) PCT Filed: Sep. 15, 2022

(86) PCT No.: PCT/CN2022/119026

§ 371 (c)(1),
(2) Date: Mar. 15, 2024

(87) PCT Pub. No.: WO2023/040958

PCT Pub. Date: Mar. 23, 2023

(65) Prior Publication Data

US 2024/0396811 A1    Nov. 28, 2024

(30) Foreign Application Priority Data

Sep. 18, 2021   (CN) .......................... 202111098188.4

(51) Int. Cl.
| | |
|---|---|
| *G06F 15/173* | (2006.01) |
| *G06N 3/098* | (2023.01) |
| *H04L 41/0893* | (2022.01) |
| *H04L 41/16* | (2022.01) |

(52) U.S. Cl.
CPC ............. *H04L 41/16* (2013.01); *G06N 3/098* (2023.01); *H04L 41/0893* (2013.01)

(58) Field of Classification Search
None
See application file for complete search history.

(56) References Cited

U.S. PATENT DOCUMENTS

2023/0146099 A1*   5/2023   Ouyang .................. H04L 41/16
709/223

FOREIGN PATENT DOCUMENTS

| | | |
|---|---|---|
| CN | 110598870 A | 12/2019 |
| CN | 111241567 A | 6/2020 |
| JP | 2015204592 A | 11/2015 |
| WO | 2016184064 A1 | 11/2016 |

(Continued)

OTHER PUBLICATIONS

Supplementary European Search Report in the corresponding EP patent Application No. 22869326.3, issued on Dec. 16, 2024.

(Continued)

*Primary Examiner* — Joseph R Maniwang

(74) *Attorney, Agent, or Firm* — Ladas & Parry, LLP

(57) ABSTRACT

A federated learning group processing method, a device and a functional entity are provided, where the federated learning group processing method includes: obtaining the characteristic information of the federated learning (FL) group; determining the second functional entity according to the characteristic information of the FL group; adding the second functional entity to the FL group.

17 Claims, 10 Drawing Sheets

(56)         References Cited

FOREIGN PATENT DOCUMENTS

| WO | 2021008017 | A1 | 1/2021 |
|----|-----------|----|--------|
| WO | 2021179176 | A1 | 9/2021 |

OTHER PUBLICATIONS

International Search Report for International Patent Application No. PCT/CN2022/119026 issued on Nov. 29, 2022 and its English translation from WIPO.

Written Opinion for International Patent Application No. PCT/CN2022/119026 issued on Nov. 29, 2022 and its English machine translation from WIPO.

\* cited by examiner

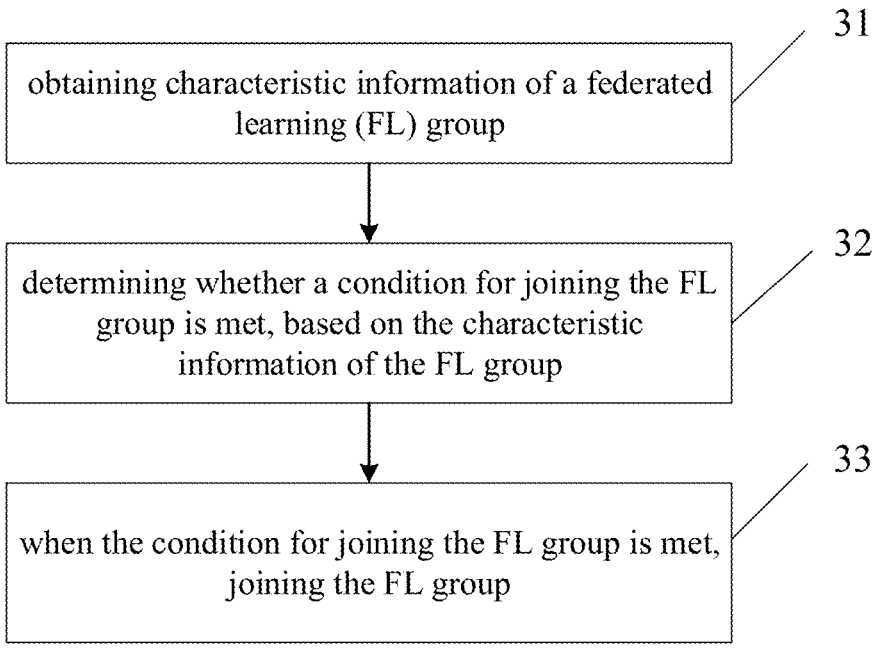

obtaining characteristic information of a federated learning (FL) group    31 determining whether a condition for joining the FL group is met, based on the characteristic information of the FL group    32 when the condition for joining the FL group is met, joining the FL group    33

Fig. 3 sending a first request or a second request to a first functional entity; where the first request carries application information or service information related to a federated learning (FL) group, and the second request carries a control policy related to the FL group, to enable the first functional entity to establish or update the FL group according to the application information, the service information or the control policy related to the FL group    41

Fig. 4

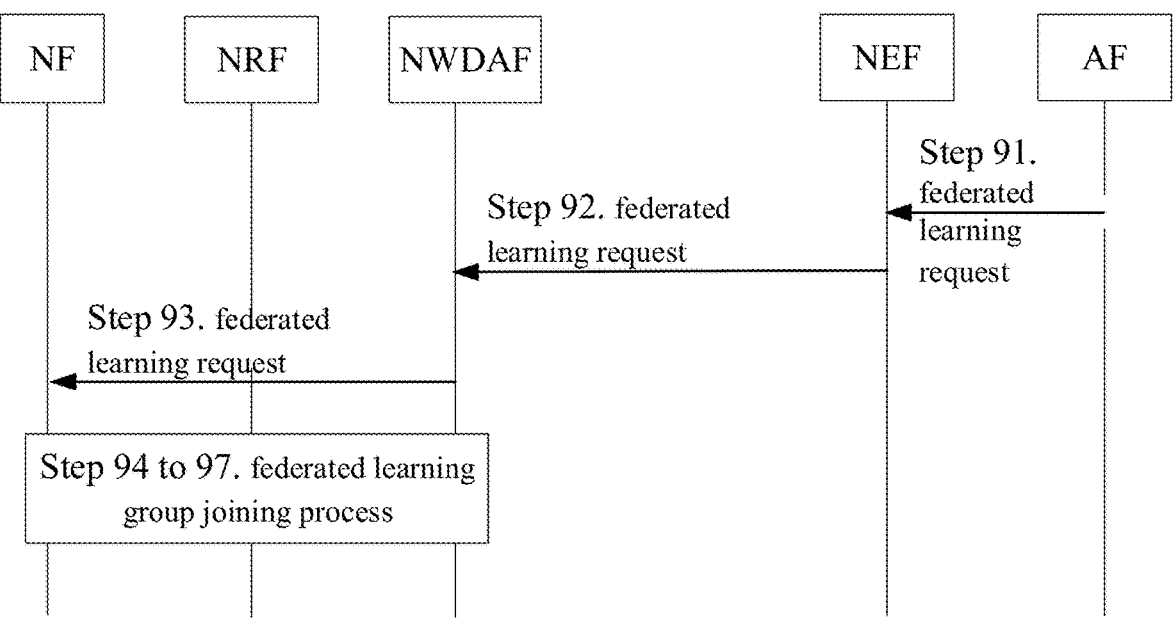

NF     NRF     NWDAF                    NEF          AF

Step 91.
federated
learning
request

Step 92. federated
learning request

Step 93. federated
learning request

Step 94 to 97. federated learning
group joining process

Fig. 9

NF     NRF     NWDAF     PCF     UDR     NEF          AF

Step 101. service parameter
generation or update request

Step 102. store the service
parameters provided by AF
into the UDR

Step 103.
data
management
notification

Step 104. provide or update the relevant federated
learning policy

Step 105 to 108. federated learning
group leaving process

Fig. 10

Step141. detecting that the UE joins the FL area or the NF serves the FL area, and determining that the UE or other NF needs to join federated learning Step 142. joining federated learning or establishing federated learning group request Step 143 to 146. federated learning group joining process

NF          NRF          NWDAF processor 153 memory 151 bus interface transceiver 152

FEDERATED LEARNING GROUP PROCESSING METHOD, DEVICE AND FUNCTIONAL ENTITY

CROSS REFERENCE TO RELATED APPLICATIONS

The present disclosure is the U.S. national phase of PCT Application PCT/CN2022/119026 filed on Sep. 15, 2022, which claims a priority of Chinese patent disclosure No. 202111098188.4 filed on Sep. 18, 2021, the disclosures of which are incorporated herein by reference in their entireties.

TECHNICAL FIELD

The present disclosure relates to the field of communication technology, and in particular, to a federated learning group processing method, a device and a functional entity.

BACKGROUND

In order to realize intelligent data analysis and control of mobile communication networks, the Network Data Analytics Function (NWDAF) is introduced in the 5th Generation Mobile Communication Technology System (5GS). NWDAF is based on artificial intelligence (AI) algorithms and provides network data analysis for other network functions (hereinafter referred to as "network data analysis" as "analysis" or "network function analysis") through interaction with other network functions (NF).

NWDAF can perform a federated learning with other NWDAFs to obtain optimized machine learning (ML) models for AI inference. A process of federated learning between NWDAFs in related art is as follows: one or more ML model users NWDAF (ML model consumer) requests the global model from the ML model provider NWDAF (ML model provider), and then uses locally collected data to train model and generate the local model, and the locally updated model parameters are sent to the ML model provider NWDAF. The ML model provider NWDAF updates the global model based on the locally updated model parameters provided by the ML model user NWDAF, and then provides the updated global model to the ML model user NWDAF. This cycle is repeated several times, and a better model for the network analysis is finally obtained.

In addition to NWDAF, User Equipment (UE) and other network functions can also support AI capabilities, such as:

(1) UE can have AI function modules to realize the intelligence of different applications and communication;

(2) Other network functions (such as Access and Mobility Management Function (AMF), Session Management Function (SMF)) can be co-located with NWDAF to achieve intelligence control function based on network data analysis.

However, in the 5G mobile communication system, how to establish federated learning between network functions (such as NWDAF and other NFs), or between network functions and UEs (such as NWDAF and UE) has become a problem to be solved.

SUMMARY

The present disclosure is to provide a federated learning group processing method, a device and a functional entity to solve the above problems.

In order to achieve the above objectives, embodiments of the present disclosure provide a federated learning group processing method, applied to a first functional entity and including:

obtaining characteristic information of a federated learning (FL) group;

determining a second functional entity according to the characteristic information of the FL group; and adding the second functional entity to the FL group.

Optionally, the obtaining the characteristic information of the FL group includes:

receiving a first request sent by an application functional entity or a network exposure functional entity, and obtaining the characteristic information of the FL group according to application information or service information which is carried in the first request and related to the FL group;

or, receiving a second request sent by a policy control functional entity, and obtaining the characteristic information of the FL group according to a control policy which is carried in the second request and related to the FL group.

Optionally, the characteristic information of the FL group includes first information, and/or identification information of functional entities allowed to join the FL group;

the first information includes any one or more of the following:

information of application or service corresponding to the FL group;

area information corresponding to the FL group;

network slice information corresponding to the FL group;

data network information corresponding to the FL group.

Optionally, the determining the second functional entity according to the characteristic information of the FL group includes:

determining the second functional entity that meets a first condition, according to the characteristic information of the FL group;

where the first condition includes one or a combination of the following conditions:

supporting the application or service corresponding to the FL group;

serving the data network, network slice or area corresponding to the FL group;

accessing the data network or network slice corresponding to the FL group;

located in the area corresponding to the FL group; and the identification information being included in the identification information of the functional entities allowed to join the FL group.

Optionally, the adding the second functional entity to the FL group includes:

sending a first FL joining request to the second functional entity, where the first FL joining request is configured to request the second functional entity to join the FL group, the first FL joining request carries information of the first functional information and the first information of the FL group;

receiving a first FL joining response sent by the second functional entity.

Optionally, the determining the second functional entity according to the characteristic information of the FL group specifically includes:

receiving a second FL joining request sent by the second functional entity, where the second FL joining request is configured to request to join the FL group, the second FL joining request carries the first information of the FL group and identification information of the second functional entity;

determining the FL group to which the second functional entity is to join, according to the first information;

determining whether the identification information of the second functional entity is included in the identification information of the functional entities allowed to join the FL group;

if so, determining that the second functional entity is the second functional entity corresponding to the characteristic information of the FL group.

Optionally, the federated learning group processing method further includes:

storing second information of the FL group, where the second information includes one or more of the following:

information of the first functional entity;

information of the second functional entity;

identification information of the FL group;

information of application or service corresponding to the FL group;

network slice information corresponding to the FL group;

data network information corresponding to the FL group; and information of a machine learning (ML) model of the FL group.

Optionally, the information of the first functional entity includes one or more of: identification information, address information and location information of the first functional entity; or, the information of the second functional entity includes one or more of: identification information, address information and location information of the second functional entity.

Optionally, the method further includes (to be specific, after the second functional entity is joined to the FL group):

determining whether the second functional entity meets conditions for leaving the FL group;

if the second functional entity meets the conditions for leaving the FL group, removing the second functional entity from the FL group.

Optionally, the second functional entity meeting the conditions for leaving the FL group includes one or more of the following situations:

the second functional entity no longer supports the application or service corresponding to the FL group;

the second functional entity no longer serves the data network, the network slice or the area corresponding to the FL group;

the second functional entity no longer accesses the data network or the network slice corresponding to the FL group;

the second functional entity leaves the area corresponding to the FL group;

the identification information of the second functional entity is no longer included in the identification information of the functional entities allowed to join the FL group;

a first FL leaving request sent by the second functional entity is received, where the first FL leaving request is configured to request to leave the FL group;

the second functional entity has an abnormal behavior, where the abnormal behavior includes: a frequency of establishing connections between the second functional entity and the first functional entity is higher than a first threshold, or an amount of data transmitted between the second functional entity and the first functional entity exceeds a second threshold.

Optionally, the federated learning group processing method further includes:

receiving updated characteristic information of the FL group sent by the third functional entity;

the determining whether the second functional entity meets the conditions for leaving the FL group includes:

according to the updated characteristic information of the FL group, determining whether the second functional entity meets the conditions for leaving the FL group.

Optionally, the removing the second functional entity from the FL group includes:

sending a second FL leaving request to the second functional entity, where the second FL leaving request is configured to request the second functional entity to leave the FL group;

receiving a second FL leaving response sent by the second functional entity.

Optionally, the removing the second functional entity from the FL group includes:

removing information of the second functional entity from the second information of the FL group.

A federated learning group processing method is further provided in the embodiment of the present disclosure, applied to a second functional entity and including:

obtaining characteristic information of a federated learning (FL) group;

determining whether a condition for joining the FL group is met, based on the characteristic information of the FL group;

when the condition for joining the FL group is met, joining the FL group.

Optionally, the obtaining the characteristic information of the FL group includes:

receiving a third request sent by an application functional entity or a network exposure functional entity, and obtaining the characteristic information of the FL group according to application information or service information which is carried in the third request and related to the FL group;

or, receiving a fourth request sent by a policy control functional entity, and obtaining the characteristic information of the FL group according to a control policy which is carried in the fourth request and related to the FL group.

Optionally, the characteristic information of the FL group includes first information, and/or identification information of functional entities allowed to join the FL group;

the first information includes any one or more of the following:

information of application or service corresponding to the FL group;

area information corresponding to the FL group;

network slice information corresponding to the FL group;

data network information corresponding to the FL group.

Optionally, the determining the second functional entity according to the characteristic information of the FL group includes:

determining the second functional entity that meets a second condition, according to the characteristic information of the FL group;

where the second condition includes one or a combination of the following conditions:

supporting the application or service corresponding to the FL group;

serving the data network, network slice or area corresponding to the FL group;

accessing the data network or network slice corresponding to the FL group;

located in the area corresponding to the FL group; and the identification information being included in the identification information of the functional entities allowed to join the FL group Optionally, prior to the joining the FL group, the method further includes:

sending a first query request to the fourth functional entity, where the first query request carries third information of the FL group;

receiving a first query response sent by the fourth functional entity, where the first query response carries information of at least one first functional entity that satisfies the third information;

based on the information of the at least one first functional entity, determining from the at least one first functional entity, the first functional entity that is to establish the FL group with the second functional entity;

where the third information of the FL group includes at least one of the following:

information of application or service corresponding to the FL group;

network slice information corresponding to the FL group;

data network information corresponding to the FL group;

information of a machine learning (ML) model of the FL group.

Optionally, the information of the first functional entity includes at least one of: address information, location information and service area information of the first functional entity;

where based on the information of the at least one first functional entity, determining from the at least one first functional entity, the first functional entity that is to establish the FL group with the second functional entity includes:

based on the information of the at least one first functional entity, selecting the first functional entity that satisfies a third condition from the at least one first functional entity as the first functional entity to establish the FL group with the second functional entity;

where the third condition includes at least one of the following:

belonging to a same local network as the second functional entity;

serving an area where the second functional entity is located; and having a shortest distance to the second functional entity among the at least one first functional entity.

Optionally, the joining the FL group includes:

sending a second FL joining request to a first functional entity, where the second FL joining request is configured to request to join the FL group, the second FL joining request carries information of the first functional information and the first information of the FL group;

receiving a second FL joining response sent by the first functional entity.

Optionally, the method further comprises:

storing second information of the FL group, where the second information includes one or more of the following:

information of the first functional entity;

information of the second functional entity;

identification information of the FL group;

information of application or service corresponding to the FL group;

network slice information corresponding to the FL group;

data network information corresponding to the FL group; and information of a machine learning (ML) model of the FL group.

Optionally, the information of the first functional entity includes one or more of: identification information, address information and location information of the first functional entity; or, the information of the second functional entity includes one or more of: identification information, address information and location information of the second functional entity.

Optionally, subsequent to joining the FL group, the federated learning group processing method further includes:

determining whether the second functional entity meets conditions for leaving the FL group;

when the second functional entity meets the conditions for leaving the FL group, sending a first FL leaving request to the first functional entity, where the first FL leaving request is configured to request to leave the FL group;

when the second functional entity meets the conditions for leaving the FL group, leaving the FL group, where the leaving the FL group comprises: sending a first FL leaving request to the first functional entity, where the first FL leaving request is configured to request to leave the FL group.

Optionally, the second functional entity meeting the conditions for leaving the FL group includes one or more of the following situations:

the second functional entity no longer supports the application or service corresponding to the FL group;

the second functional entity no longer serves the data network, the network slice or the area corresponding to the FL group;

the second functional entity no longer accesses the data network or the network slice corresponding to the FL group; and the second functional entity leaves the area corresponding to the FL group.

Optionally, the method further comprises: receiving updated characteristic information of the FL group sent by the third functional entity;

the determining whether the second functional entity meets the conditions for leaving the FL group includes:

according to the updated characteristic information of the FL group, determining whether the second functional entity meets the conditions for leaving the FL group; to be specific, the determining whether the second functional entity meets the conditions for leaving the FL group includes: receiving updated characteristic information of the FL group sent by the third functional entity; according to the updated characteristic information of the FL group, determining whether the second functional entity meets the conditions for leaving the FL group.

Optionally, when the second functional entity meets the conditions for leaving the FL group, the method further comprises:

deleting second information of the FL group stored in the second functional entity, where the leaving the FL group further include: deleting second information of the FL group stored in the second functional entity.

A federated learning group processing method is provided in the embodiment of the present disclosure, applied to a third functional entity and including:

sending a first request or a second request to a first functional entity;

where the first request carries application information or service information related to a federated learning (FL) group, and the second request carries a control policy related to the FL group, to enable the first functional entity to establish or update the FL group according to the application information, the service information or the control policy related to the FL group.

Optionally, the application information, the service information or the control policy related to the FL group includes: the characteristic information of the FL group.

Optionally, the characteristic information of the FL group includes first information, and/or identification information of functional entities allowed to join the FL group;

the first information includes any one or more of the following:

information of application or service corresponding to the FL group;

area information corresponding to the FL group;

network slice information corresponding to the FL group;

data network information corresponding to the FL group.

A functional entity is provided in the embodiment of the present disclosure, where the functional entity is a first functional entity and including a memory, a transceiver and a processor; where the memory is configured to store computer programs; the transceiver is configured to send and receive data under a control of the processor; the processor is configured to read the computer programs in the memory to perform:

obtaining characteristic information of a federated learning (FL) group;

determining a second functional entity according to the characteristic information of the FL group; and adding the second functional entity to the FL group.

Optionally, the obtaining the characteristic information of the FL group includes:

receiving, by the transceiver, a first request sent by an application functional entity or a network exposure functional entity, and obtaining the characteristic information of the FL group according to application information or service information which is carried in the first request and related to the FL group;

or, receiving, by the transceiver, a second request sent by a policy control functional entity, and obtaining the characteristic information of the FL group according to a control policy which is carried in the second request and related to the FL group.

Optionally, the characteristic information of the FL group includes first information, and/or identification information of functional entities allowed to join the FL group;

the first information includes any one or more of the following:

information of application or service corresponding to the FL group;

area information corresponding to the FL group;

network slice information corresponding to the FL group;

data network information corresponding to the FL group.

Optionally, the determining the second functional entity according to the characteristic information of the FL group includes:

8 determining the second functional entity that meets a first condition, according to the characteristic information of the FL group;

where the first condition includes one or a combination of the following conditions:

supporting the application or service corresponding to the FL group;

serving the data network, network slice or area corresponding to the FL group;

accessing the data network or network slice corresponding to the FL group;

located in the area corresponding to the FL group; and the identification information being included in the identification information of the functional entities allowed to join the FL group.

Optionally, the adding the second functional entity to the FL group includes:

sending, through a transceiver, a first FL joining request to the second functional entity, where the first FL joining request is configured to request the second functional entity to join the FL group, the first FL joining request carries information of the first functional information and the first information of the FL group;

receiving, by a transceiver, a first FL joining response sent by the second functional entity.

Optionally, the determining the second functional entity according to the characteristic information of the FL group specifically includes:

receiving, by the transceiver, a second FL joining request sent by the second functional entity, where the second FL joining request is configured to request to join the FL group, the second FL joining request carries the first information of the FL group and identification information of the second functional entity;

determining the FL group to which the second functional entity is to join, according to the first information;

determining whether the identification information of the second functional entity is included in the identification information of the functional entities allowed to join the FL group;

if so, determining that the second functional entity is the second functional entity corresponding to the characteristic information of the FL group.

Optionally, the processor is further configured to:

store second information of the FL group through the memory, where the second information includes one or more of the following:

information of the first functional entity;

information of the second functional entity;

identification information of the FL group;

information of application or service corresponding to the FL group;

network slice information corresponding to the FL group;

data network information corresponding to the FL group; and information of a machine learning (ML) model of the FL group.

Optionally, the information of the first functional entity includes one or more of: identification information, address information and location information of the first functional entity; or, the information of the second functional entity includes one or more of: identification information, address information and location information of the second functional entity.

Optionally, the processor is further configured to perform: determining whether the second functional entity meets conditions for leaving the FL group;

if the second functional entity meets the conditions for leaving the FL group, removing the second functional entity from the FL group.

Optionally, the second functional entity meeting the conditions for leaving the FL group includes one or more of the following situations:

the second functional entity no longer supports the application or service corresponding to the FL group;

the second functional entity no longer serves the data network, the network slice or the area corresponding to the FL group;

the second functional entity no longer accesses the data network or the network slice corresponding to the FL group;

the second functional entity leaves the area corresponding to the FL group;

the identification information of the second functional entity is no longer included in the identification information of the functional entities allowed to join the FL group;

a first FL leaving request sent by the second functional entity is received, where the first FL leaving request is configured to request to leave the FL group;

the second functional entity has an abnormal behavior, where the abnormal behavior includes: a frequency of establishing connections between the second functional entity and the first functional entity is higher than a first threshold, or an amount of data transmitted between the second functional entity and the first functional entity exceeds a second threshold.

Optionally, the determining whether the second functional entity meets conditions for leaving the FL group comprises:

receiving, through the transceiver, updated characteristic information of the FL group sent by the third functional entity;

according to the updated characteristic information of the FL group, determining whether the second functional entity meets the conditions for leaving the FL group.

Optionally, the removing the second functional entity from the FL group includes:

sending, through the transceiver, a second FL leaving request to the second functional entity, where the second FL leaving request is configured to request the second functional entity to leave the FL group;

receiving, through the transceiver, a second FL leaving response sent by the second functional entity.

Optionally, the removing the second functional entity from the FL group includes:

removing information of the second functional entity from the second information of the FL group.

A functional entity is provided in the embodiment of the present disclosure, where the functional entity is a second functional entity and including a memory, a transceiver and a processor; where the memory is configured to store computer programs; the transceiver is configured to send and receive data under a control of the processor; the processor is configured to read the computer programs in the memory to perform:

obtaining characteristic information of a federated learning (FL) group;

determine whether a condition for joining the FL group is met, based on the characteristic information of the FL group;

when the condition for joining the FL group is met, joining the FL group.

Optionally, the obtaining the characteristic information of the FL group includes:

receiving, by the transceiver, a third request sent by an application functional entity or a network exposure functional entity, and obtaining the characteristic information of the FL group according to application information or service information which is carried in the third request and related to the FL group;

or, receiving, by the transceiver, a fourth request sent by a policy control functional entity, and obtaining the characteristic information of the FL group according to a control policy which is carried in the fourth request and related to the FL group.

Optionally, the characteristic information of the FL group includes first information, and/or identification information of functional entities allowed to join the FL group;

the first information includes any one or more of the following:

information of application or service corresponding to the FL group;

area information corresponding to the FL group;

network slice information corresponding to the FL group;

data network information corresponding to the FL group.

Optionally, the determine whether the condition for joining the FL group is met, based on the characteristic information of the FL group includes:

determining the second functional entity that meets a second condition, according to the characteristic information of the FL group;

where the second condition includes one or a combination of the following conditions:

supporting the application or service corresponding to the FL group;

serving the data network, network slice or area corresponding to the FL group;

accessing the data network or network slice corresponding to the FL group;

located in the area corresponding to the FL group; and the identification information being included in the identification information of the functional entities allowed to join the FL group.

Optionally, the processor is further configured to perform:

prior to the joining the FL group, sending, through the transceiver, a first query request to the fourth functional entity, where the first query request carries third information of the FL group;

receiving, through the transceiver, a first query response sent by the fourth functional entity, where the first query response carries information of at least one first functional entity that satisfies the third information;

based on the information of the at least one first functional entity, determining from the at least one first functional entity, the first functional entity that is to establish the FL group with the second functional entity;

where the third information of the FL group includes at least one of the following:

information of application or service corresponding to the FL group;

network slice information corresponding to the FL group;

data network information corresponding to the FL group;

information of a machine learning (ML) model of the FL group.

Optionally, the information of the first functional entity includes at least one of: address information, location information and service area information of the first functional entity;

where based on the information of the at least one first functional entity, determining from the at least one first functional entity, the first functional entity that is to establish the FL group with the second functional entity includes:

based on the information of the at least one first functional entity, selecting the first functional entity that satisfies a third condition from the at least one first functional entity as the first functional entity to establish the FL group with the second functional entity;

where the third condition includes at least one of the following:

belonging to a same local network as the second functional entity;

serving an area where the second functional entity is located; and having a shortest distance to the second functional entity among the at least one first functional entity.

Optionally, the joining the FL group includes:

sending, through the transceiver, a second FL joining request to the first functional entity, where the second FL joining request is configured to request to join the FL group, the second FL joining request carries information of the first functional information and the first information of the FL group;

receiving, through the transceiver, a second FL joining response sent by the first functional entity.

Optionally, the processor is further configured to perform:

storing second information of the FL group, where the second information includes one or more of the following:

information of the first functional entity;

information of the second functional entity;

identification information of the FL group;

information of application or service corresponding to the FL group;

network slice information corresponding to the FL group;

data network information corresponding to the FL group; and information of a machine learning (ML) model of the FL group.

Optionally, the information of the first functional entity includes one or more of: identification information, address information and location information of the first functional entity; or, the information of the second functional entity includes one or more of: identification information, address information and location information of the second functional entity.

Optionally, subsequent to joining the FL group, the processor is further configured to:

determining whether the second functional entity meets conditions for leaving the FL group;

when the second functional entity meets the conditions for leaving the FL group, leaving the FL group, wherein the leaving the FL group comprises: sending a first FL leaving request to the first functional entity, where the first FL leaving request is configured to request to leave the FL group.

Optionally, the second functional entity meeting the conditions for leaving the FL group includes one or more of the following situations:

the second functional entity no longer supports the application or service corresponding to the FL group;

the second functional entity no longer serves the data network, the network slice or the area corresponding to the FL group;

the second functional entity no longer accesses the data network or the network slice corresponding to the FL group; and the second functional entity leaves the area corresponding to the FL group.

Optionally, the determining whether the second functional entity meets the conditions for leaving the FL group includes:

receiving, through the transceiver, updated characteristic information of the FL group sent by the third functional entity;

according to the updated characteristic information of the FL group, determining whether the second functional entity meets the conditions for leaving the FL group.

Optionally, the leaving the FL group further comprises:

deleting second information of the FL group stored in the second functional entity.

A functional entity is provided in the embodiment of the present disclosure, where the functional entity is a third functional entity and including a memory, a transceiver and a processor; where the memory is configured to store computer programs; the transceiver is configured to send and receive data under a control of the processor; the processor is configured to read the computer programs in the memory to perform:

sending, through the transceiver, a first request or a second request to a first functional entity;

where the first request carries application information or service information related to a federated learning (FL) group, and the second request carries a control policy related to the FL group, to enable the first functional entity to establish or update the FL group according to the application information, the service information or the control policy related to the FL group.

Optionally, the application information, the service information or the control policy related to the FL group includes: the characteristic information of the FL group.

Optionally, the characteristic information of the FL group includes first information, and/or identification information of functional entities allowed to join the FL group;

the first information includes any one or more of the following:

information of application or service corresponding to the FL group;

area information corresponding to the FL group;

network slice information corresponding to the FL group;

data network information corresponding to the FL group.

A federated learning group processing device is provided in the embodiment of the present disclosure, applied to a first functional entity and including:

a first obtaining unit, configured to obtain characteristic information of a federated learning (FL) group;

a first determining unit, configured to determine a second functional entity according to the characteristic information of the FL group; and a first processing unit, configured to join the second functional entity to the FL group.

Optionally, the obtaining the characteristic information of the FL group includes:

receiving a first request sent by an application functional entity or a network exposure functional entity, and obtaining the characteristic information of the FL group according to application information or service information which is carried in the first request and related to the FL group;

or, receiving a second request sent by a policy control functional entity, and obtaining the characteristic information of the FL group according to a control policy which is carried in the second request and related to the FL group.

Optionally, the characteristic information of the FL group includes first information, and/or identification information of functional entities allowed to join the FL group;

the first information includes any one or more of the following:

information of application or service corresponding to the FL group;

area information corresponding to the FL group;

network slice information corresponding to the FL group;

data network information corresponding to the FL group.

Optionally, the determining the second functional entity according to the characteristic information of the FL group includes:

determining the second functional entity that meets a first condition, according to the characteristic information of the FL group;

where the first condition includes one or a combination of the following conditions:

supporting the application or service corresponding to the FL group;

serving the data network, network slice or area corresponding to the FL group;

accessing the data network or network slice corresponding to the FL group;

located in the area corresponding to the FL group; and the identification information being included in the identification information of the functional entities allowed to join the FL group.

Optionally, the adding the second functional entity to the FL group includes:

sending a first FL joining request to the second functional entity, where the first FL joining request is configured to request the second functional entity to join the FL group, the first FL joining request carries information of the first functional information and the first information of the FL group;

receiving a first FL joining response sent by the second functional entity.

Optionally, the determining the second functional entity according to the characteristic information of the FL group specifically includes:

receiving a second FL joining request sent by the second functional entity, where the second FL joining request is configured to request to join the FL group, the second FL joining request carries the first information of the FL group and identification information of the second functional entity;

determining the FL group to which the second functional entity is to join, according to the first information;

determining whether the identification information of the second functional entity is included in the identification information of the functional entities allowed to join the FL group;

if so, determining that the second functional entity is the second functional entity corresponding to the characteristic information of the FL group.

Optionally, device further includes:

a first storing unit, configured to store second information of the FL group, where the second information includes one or more of the following:

information of the first functional entity;

information of the second functional entity;

identification information of the FL group;

information of application or service corresponding to the FL group;

network slice information corresponding to the FL group;

data network information corresponding to the FL group; and information of a machine learning (ML) model of the FL group.

Optionally, the information of the first functional entity includes one or more of: identification information, address information and location information of the first functional entity; or, the information of the second functional entity includes one or more of: identification information, address information and location information of the second functional entity.

Optionally, the device further includes:

a second determining unit, configured to, after the second functional entity is joined to the FL group, determine whether the second functional entity meets conditions for leaving the FL group;

a second processing unit, configured to, if the second functional entity meets the conditions for leaving the FL group, remove the second functional entity from the FL group.

Optionally, the second functional entity meeting the conditions for leaving the FL group includes one or more of the following situations:

the second functional entity no longer supports the application or service corresponding to the FL group;

the second functional entity no longer serves the data network, the network slice or the area corresponding to the FL group;

the second functional entity no longer accesses the data network or the network slice corresponding to the FL group;

the second functional entity leaves the area corresponding to the FL group;

the identification information of the second functional entity is no longer included in the identification information of the functional entities allowed to join the FL group;

a first FL leaving request sent by the second functional entity is received, where the first FL leaving request is configured to request to leave the FL group;

the second functional entity has an abnormal behavior, where the abnormal behavior includes: a frequency of establishing connections between the second functional entity and the first functional entity is higher than a first threshold, or an amount of data transmitted between the second functional entity and the first functional entity exceeds a second threshold.

Optionally, the determining whether the second functional entity meets conditions for leaving the FL group includes:

receiving updated characteristic information of the FL group sent by the third functional entity;

the determining whether the second functional entity meets the conditions for leaving the FL group includes:

according to the updated characteristic information of the FL group, determining whether the second functional entity meets the conditions for leaving the FL group.

Optionally, the removing the second functional entity from the FL group includes:

sending a second FL leaving request to the second functional entity, where the second FL leaving request is configured to request the second functional entity to leave the FL group;

receiving a second FL leaving response sent by the second functional entity.

Optionally, the removing the second functional entity from the FL group includes:

removing information of the second functional entity from the second information of the FL group.

A federated learning group processing device is provided in the embodiment of the present disclosure, applied to a second functional entity and including:

a second obtaining unit, configured to obtain characteristic information of a federated learning (FL) group;

a third determining unit, configured to determine whether a condition for joining the FL group is met, based on the characteristic information of the FL group; and a third processing unit, configured to, when the condition for joining the FL group is met, join the FL group.

Optionally, the obtaining the characteristic information of the FL group includes:

receiving a third request sent by an application functional entity or a network exposure functional entity, and obtaining the characteristic information of the FL group according to application information or service information which is carried in the third request and related to the FL group;

or, receiving a fourth request sent by a policy control functional entity, and obtaining the characteristic information of the FL group according to a control policy which is carried in the fourth request and related to the FL group.

Optionally, the characteristic information of the FL group includes first information, and/or identification information of functional entities allowed to join the FL group;

the first information includes any one or more of the following:

information of application or service corresponding to the FL group;

area information corresponding to the FL group;

network slice information corresponding to the FL group;

data network information corresponding to the FL group.

Optionally, the determining the second functional entity according to the characteristic information of the FL group includes:

determining the second functional entity that meets a second condition, according to the characteristic information of the FL group;

where the second condition includes one or a combination of the following conditions:

supporting the application or service corresponding to the FL group;

serving the data network, network slice or area corresponding to the FL group;

accessing the data network or network slice corresponding to the FL group;

located in the area corresponding to the FL group; and the identification information being included in the identification information of the functional entities allowed to join the FL group Optionally, the device further includes:

a first sending unit, configured to, before joining the FL group, send a first query request to the fourth functional entity, where the first query request carries third information of the FL group;

a first receiving unit, configured to receive a first query response sent by the fourth functional entity, where the first query response carries information of at least one first functional entity that satisfies the third information;

a first determining unit, configured to, based on the information of the at least one first functional entity, determine from the at least one first functional entity, the first functional entity that is to establish the FL group with the second functional entity;

where the third information of the FL group includes at least one of the following:

information of application or service corresponding to the FL group;

network slice information corresponding to the FL group;

data network information corresponding to the FL group;

information of a machine learning (ML) model of the FL group.

Optionally, the information of the first functional entity includes at least one of: address information, location information and service area information of the first functional entity;

where based on the information of the at least one first functional entity, determining from the at least one first functional entity, the first functional entity that is to establish the FL group with the second functional entity includes:

based on the information of the at least one first functional entity, selecting the first functional entity that satisfies a third condition from the at least one first functional entity as the first functional entity to establish the FL group with the second functional entity;

where the third condition includes at least one of the following:

belonging to a same local network as the second functional entity;

serving an area where the second functional entity is located; and having a shortest distance to the second functional entity among the at least one first functional entity.

Optionally, the joining the FL group includes:

sending a second FL joining request to a first functional entity, where the second FL joining request is configured to request to join the FL group, the second FL joining request carries information of the first functional information and the first information of the FL group;

receiving a second FL joining response sent by the first functional entity.

Optionally, the method further comprises:

storing second information of the FL group, where the second information includes one or more of the following:

information of the first functional entity;

information of the second functional entity;

identification information of the FL group;

information of application or service corresponding to the FL group;

network slice information corresponding to the FL group;

data network information corresponding to the FL group; and information of a machine learning (ML) model of the FL group.

Optionally, the information of the first functional entity includes one or more of: identification information, address information and location information of the first functional entity; or, the information of the second functional entity includes one or more of: identification information, address information and location information of the second functional entity.

Optionally, the device further includes:

a fifth determining unit, configured to, after joining the FL group, determine whether the second functional entity meets conditions for leaving the FL group;

a fourth processing unit, configured to, when the second functional entity meets the conditions for leaving the FL group, leave the FL group;

where the leaving the FL group comprises: sending a first FL leaving request to the first functional entity, where the first FL leaving request is configured to request to leave the FL group.

Optionally, the second functional entity meeting the conditions for leaving the FL group includes one or more of the following situations:

the second functional entity no longer supports the application or service corresponding to the FL group;

the second functional entity no longer serves the data network, the network slice or the area corresponding to the FL group;

the second functional entity no longer accesses the data network or the network slice corresponding to the FL group; and the second functional entity leaves the area corresponding to the FL group.

Optionally, the determining whether the second functional entity meets the conditions for leaving the FL group includes:

receiving updated characteristic information of the FL group sent by the third functional entity;

according to the updated characteristic information of the FL group, determining whether the second functional entity meets the conditions for leaving the FL group;

Optionally, the leaving the FL group further comprises:

deleting second information of the FL group stored in the second functional entity.

A federated learning group processing device is provided in the embodiment of the present disclosure, applied to a third functional entity and including:

a second sending unit, configured to send a first request or a second request to a first functional entity;

where the first request carries application information or service information related to a federated learning (FL) group, and the second request carries a control policy related to the FL group, to enable the first functional entity to establish or update the FL group according to the application information, the service information or the control policy related to the FL group.

Optionally, the application information, the service information or the control policy related to the FL group includes: the characteristic information of the FL group.

Optionally, the characteristic information of the FL group includes first information, and/or identification information of functional entities allowed to join the FL group;

the first information includes any one or more of the following:

information of application or service corresponding to the FL group;

area information corresponding to the FL group;

network slice information corresponding to the FL group;

data network information corresponding to the FL group.

A processor-readable storage medium, where the processor-readable storage medium stores a computer program, the computer program is configured to cause the processor to perform the federated learning group processing method at the first functional entity side; or, the computer program is configured to cause the processor to perform the federated learning group processing method at the second functional entity side; or, the computer program is configured to cause the processor to perform the federated learning group processing method at the third functional entity side.

The technical effect of the present disclosure are as follows:

According to the federated learning group processing method in the embodiments of the present disclosure, characteristic information of a federated learning (FL) group is obtained, a second functional entity is determined according to the characteristic information of the FL group, and the second functional entity is joined to the FL group, thereby realizing dynamic processing of FL groups, so as to better meet the needs of network and service intelligence, and improve the intelligent performance of communications and applications.

BRIEF DESCRIPTION OF THE DRAWINGS

FIG. 3 is a schematic flowchart 2 of a federated learning group processing method according to the embodiment of the present disclosure;

FIG. 4 is a schematic flowchart 3 of a federated learning group processing method according to the embodiment of the present disclosure;

FIG. 9 is a schematic flowchart 5 of the specific implementation of the federated learning group processing method according to the embodiment of the present disclosure;

FIG. 10 is a schematic flowchart 6 of the specific implementation of the federated learning group processing method according to the embodiment of the present disclosure;

DETAILED DESCRIPTION

In the embodiments of the present disclosure will be clearly and completely described below with reference to the accompanying drawings in the embodiments of the present disclosure. Obviously, the described embodiments are only some of the embodiments of the present disclosure, not all of them. Based on the embodiments in this disclosure, all other embodiments obtained by those of ordinary skill in the art without creative efforts fall within the scope of protection of this disclosure.

In the embodiment of the present disclosure, the term "plurality" refers to two or more than two, and other quantifiers are similar to it.

It is explained here that the technical solutions provided by the embodiments of the present disclosure can be applied to a variety of systems, especially 5G systems. For example, applicable systems may be global system of mobile communication (GSM) system, code division multiple access (code division multiple access, CDMA) system, wideband code division multiple access (Wideband Code Division Multiple Access, WCDMA) general packet Wireless service (general packet radio service, GPRS) system, long term evolution (long term evolution, LTE) system, LTE frequency division duplex (FDD) system, LTE time division duplex (TDD) system, Long term evolution advanced (LTE-A) system, universal mobile telecommunication system (UMTS), worldwide interoperability for microwave access (WiMAX) system, 5G New Radio, NR) system, etc. These various systems include terminal device and network device. The system may also include core network parts, such as the Evolved Packet System (EPS), 5G System (5th Generation Mobile Communication Technology System, 5GS), etc.

Figure 1:
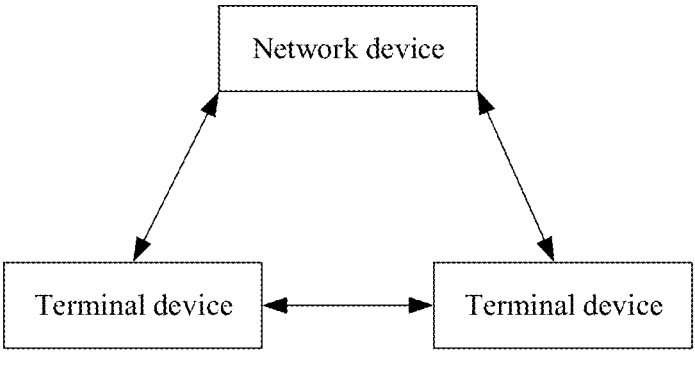
FIG. 1 is a schematic view of a wireless communication system architecture according to the embodiment of the present disclosure.

FIG. 1 shows a block diagram of a wireless communication system to which embodiments of the present disclosure are applicable. The wireless communication system includes a first functional entity and a second functional entity. The first functional entity and the second functional entity may be implemented as terminal device and/or network device respectively.

The present disclosure may be a device that provides voice and/or data connectivity to users, a handheld device with a wireless connection function, or other processing devices connected to a wireless modem, etc. In different systems, the names of terminal device may also be different. For example, in a 5G system, the terminal device may be called User Equipment (UE). Wireless terminal device can communicate with one or more core networks (Core Network, CN) via a Radio Access Network (RAN). The wireless terminal device can be a mobile terminal device, such as a mobile phone (also known as a "cell phone") and computers with mobile terminal devices, which may be, for example, portable, pocket-sized, handheld, computer-built-in or vehicle-mounted mobile devices, which exchange speech and/or data with the radio access network. For example, Personal Communication Service (PCS) phones, cordless phones, Session Initiated Protocol (SIP) phones, Wireless Local Loop (WLL) stations, Personal Digital Assistants, PDA) and other equipment. Wireless terminal device may also be called a system, a subscriber unit, a subscriber station, a mobile station, a mobile station, a remote station, or an access point, remote terminal device (remote terminal), access terminal device (access terminal), user terminal device (user terminal), user agent (user agent), user device (user device), are not limited in the embodiments of the present disclosure.

The network device in the present disclosure may be a base station, and the base station may include multiple cells that provide services for terminals. Depending on the specific application, a base station can also be called an access point, or it can be a device in the access network that communicates with wireless terminal device through one or more sectors on the air interface, or it can be named by another name. Network device can be configured to exchange received air frames with Internet Protocol (IP) packets and act as a router between the wireless terminal device and the rest of the access network, which can include the Internet. Protocol (IP) communications network. Network devices also coordinate attribute management of air interface. For example, the network device involved in the embodiments of the present disclosure may be a network device (Base Transceiver Station, BTS) in Global System for Mobile communications (GSM) or Code Division Multiple Access (CDMA)), or it can be a network device (NodeB) in a Wide-band Code Division Multiple Access (WCDMA), or an evolutionary network device in a long term evolution (LTE) system (evolutional Node B, eNB or e-NodeB), 5G base station (gNB) in 5G network architecture (next generation system), or home evolved base station (Home evolved Node B, HeNB), relay node (relay node), home base station (femto), pico base station (pico), etc., are not limited in the embodiments of the present disclosure. In some network structures, network devices may include centralized unit (CU) nodes and distributed unit (DU) nodes, and the centralized units and distributed units may also be arranged geographically separately.

Network device and terminal device can each use one or more antennas for Multi-Input Multi-Output (MIMO) transmission. MIMO transmission can be Single User MIMO (Single User MIMO, SU-MIMO) or Multi-User MIMO. (Multiple User MIMO, MU-MIMO). Depending on the shape and number of root antenna combinations, MIMO transmission can be 2D-MIMO, 3D-MIMO, FD-MIMO or massive-MIMO, or it can be diversity transmission, precoding transmission or beamforming transmission, etc.

Based on the above, embodiments of the present disclosure provide a federated learning group processing method, device and functional entity to implement dynamic processing of federated learning groups. Among them, the methods, devices and functional entities are conceived based on the same application. Since the methods, devices and functional entities have similar principles for solving problems, the implementation of the methods, devices and functional entities can refer to each other, and repeated details will not be repeated.

Figure 2:
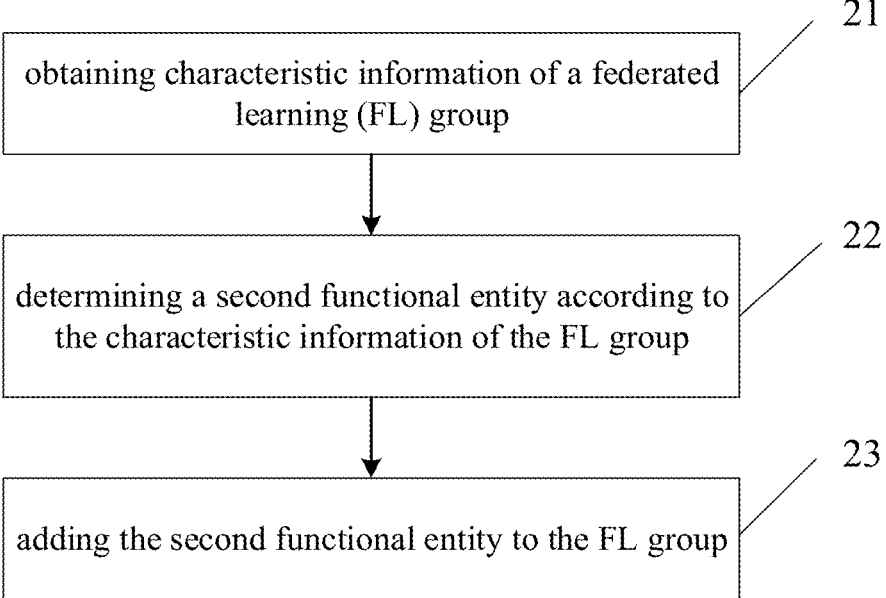
FIG. 2 is a schematic flowchart 1 of a federated learning group processing method according to the embodiment of the present disclosure.

The federated learning group processing method provided by the embodiment of the present disclosure is applied to the first functional entity, as shown in FIG. 2. The method includes:

Step 21: obtaining characteristic information of a federated learning (FL) group;

Step 22: determining a second functional entity according to the characteristic information of the FL group;

Step 23: adding the second functional entity to the FL group.

The federated learning group processing method provided by the embodiment of the present disclosure obtains the characteristic information of the federated learning (FL) group; determines the second functional entity according to the characteristic information of the FL group; and joins the second functional entity to the FL group, thereby realizing dynamic processing of FL groups, and better meeting the needs of network and service intelligence, and improving the intelligent performance of communications and applications.

The obtaining the characteristic information of the FL group includes: receiving a first request sent by an application functional entity or a network exposure functional entity, and obtaining the characteristic information of the FL group according to application information or service information which is carried in the first request and related to the FL group; or, receiving a second request sent by a policy control functional entity, and obtaining the characteristic information of the FL group according to a control policy which is carried in the second request and related to the FL group.

Therefore, the first functional entity may dynamically process the FL group according to network policies or application requirements.

Regarding "obtaining the characteristic information of the FL group", it may be to create an FL group and obtain the characteristic information of the FL group, or to obtain the characteristic information for the already created FL group, which is not limited here. In addition, when the second functional entity is a terminal, the first request or the second request is received through the application layer of the terminal.

In the embodiment of the present disclosure, the characteristic information of the FL group includes first information, and/or identification information of functional entities allowed to join the FL group; the first information includes any one or more of the following: information of application or service corresponding to the FL group; area information corresponding to the FL group; network slice information corresponding to the FL group; data network information corresponding to the FL group.

This allows for more accurate processing of the FL group.

The determining the second functional entity according to the characteristic information of the FL group includes:

determining the second functional entity that satisfies the first condition according to the characteristic information of the FL group; where the first condition includes the following One or a combination of conditions: support the application or service corresponding to the FL group; serve the data network, network slice or area corresponding to the FL group; access the data network or network slice corresponding to the FL group; be located in the In the area corresponding to the FL group; the identification information is included in the identification information of the functional entity allowed to join the FL group.

In this way, the second functional entity that can be joined to the FL group can be determined more accurately. Regarding "serving the data network, network slice or area corresponding to the FL group" may be for the second functional entity being NF; regarding "accessing the data network or network slice corresponding to the FL group" may be for the second functional entity being a UE, specifically, a protocol data unit PDU session is established under the data network or network slice corresponding to the FL group.

In the embodiment of the present disclosure, the adding the second functional entity to the FL group includes: sending a first FL joining request to the second functional entity, where the first FL joining request is configured to request the second functional entity to join the FL group, the first FL joining request carries information of the first functional information and the first information of the FL group; receiving a first FL joining response sent by the second functional entity.

This enables the second functional entity to passively join the FL group.

The determining the second functional entity according to the characteristic information of the FL group specifically includes: receiving a second FL joining request sent by the second functional entity, where the second FL joining request is configured to request to join the FL group, the second FL joining request carries the first information of the FL group and identification information of the second functional entity; determining the FL group to which the second functional entity is to join, according to the first information; determining whether the identification information of the second functional entity is included in the identification information of the functional entities allowed to join the FL group; if so, determining that the second functional entity is the second functional entity corresponding to the characteristic information of the FL group.

This enables the second functional entity to actively join the FL group. The identification information is included in the characteristic information of the FL group to which the second functional entity is to join; please refer to the above for details of the characteristic information.

Further, the federated learning group processing method further includes: storing second information of the FL group, where the second information includes one or more of the following: information of the first functional entity; information of the second functional entity; identification information of the FL group; information of application or service corresponding to the FL group; network slice information corresponding to the FL group; data network information corresponding to the FL group; and information of a machine learning (ML) model of the FL group.

This can facilitate operations on the FL group. Regarding "storage", it can be the storage when the FL group is created, or when a new functional entity is joined to the FL group; or the storage when the FL group is updated (such as updating the second information of the FL group), which is not limited here.

In the embodiment of the present disclosure, the information of the first functional entity includes one or more of: identification information, address information and location information of the first functional entity; or, the information of the second functional entity includes one or more of: identification information, address information and location information of the second functional entity.

This can facilitate precise operations on the first functional entity and the second functional entity.

Further, after the adding the second functional entity to the FL group, the method further includes: determining whether the second functional entity meets the conditions for leaving the FL group; if the condition of the group is met, the second functional entity is removed from the FL group.

This enables removal of members of the FL group.

The second functional entity meeting the conditions for leaving the FL group includes one or more of the following situations: the second functional entity no longer supports the application or service corresponding to the FL group; the second functional entity no longer serves the data network, the network slice or the area corresponding to the FL group; the second functional entity no longer accesses the data network or the network slice corresponding to the FL group; the second functional entity leaves the area corresponding to the FL group; the identification information of the second functional entity is no longer included in the identification information of the functional entities allowed to join the FL group; a first FL leaving request sent by the second functional entity is received, where the first FL leaving request is configured to request to leave the FL group; the second functional entity has an abnormal behavior, where the abnormal behavior includes: a frequency of establishing connections between the second functional entity and the first functional entity is higher than a first threshold, or an amount of data transmitted between the second functional entity and the first functional entity exceeds a second threshold.

This can facilitate accurate confirmation of whether to remove the second functional entity from the FL group. Regarding "the second functional entity no longer serves the data network, network slice or area corresponding to the FL group" may be directed to the second functional entity being the NF; regarding "the second functional entity no longer accesses the data network or network slice corresponding to the FL group" may be directed to the second functional entity being the UE, specifically releasing the PDU session established under the data network or network slice corresponding to the FL group.

In the embodiment of the present disclosure, the method further includes: receiving updated characteristic information of the FL group sent by the third functional entity, to update the characteristic information of the FL group; the determining whether the second functional entity meets the conditions for leaving the FL group includes: according to the updated characteristic information of the FL group, determining whether the second functional entity meets the conditions for leaving the FL group.

This enables third-party triggering to determine whether to remove the second functional entity from the FL group. The third functional entity may be an application functional entity, a network exposure functional entity or a policy control functional entity, which is not limited here.

where removing the second functional entity from the FL group includes: sending a second FL leaving request to the second functional entity, where the second FL leaving request is configured to request the second functional entity to leave the FL group; and receive a second FL leaving response sent by the second functional entity.

This enables the second functional entity to be removed from the FL group. It should be noted here that the method of "sending the second FL leaving request to the second functional entity" is not used in combination with the above method of "receiving the first FL leaving request sent by the second functional entity".

In the embodiment of the present disclosure, removing the second functional entity from the FL group includes: deleting the information of the second functional entity from the second information of the FL group.

In this way, the relevant information about the FL group is real-time and accurate.

Embodiments of the present disclosure also provide a federated learning group processing method, as shown in FIG. 3, applied to the second functional entity. The method includes:

Step 31: obtaining characteristic information of a federated learning (FL) group;

Step 32: determining whether a condition for joining the FL group is met, based on the characteristic information of the FL group;

Step 33: when the condition for joining the FL group is met, joining the FL group.

The federated learning group processing method provided by the embodiment of the present disclosure obtains the characteristic information of the federated learning (FL) group; determines whether the condition for joining the FL group is met based on the characteristic information of the FL group; and joins the FL group when the conditions are met. Under the conditions, joining the FL group can realize dynamic processing of the FL group, thereby better meeting the needs of network and service intelligence, and improving the intelligent performance of communications and applications.

The obtaining the characteristic information of the FL group includes:

receiving a third request sent by an application functional entity or a network exposure functional entity, and obtaining the characteristic information of the FL group according to application information or service information which is carried in the third request and related to the FL group; or, receiving a fourth request sent by a policy control functional entity, and obtaining the characteristic information of the FL group according to a control policy which is carried in the fourth request and related to the FL group.

This enables the second functional entity to flexibly determine the FL group according to network policies or application requirements.

Regarding "obtaining the characteristic information of the FL group", it may be to create an FL group and obtain the characteristic information of the FL group, or to obtain the characteristic information for the already created FL group, which is not limited here. In addition, when the second functional entity is a terminal, the first request or the second request is received through the application layer of the terminal.

In the embodiment of the present disclosure, the characteristic information of the FL group includes first information, and/or identification information of functional entities allowed to join the FL group; the first information includes any one or more of the following: information of application or service corresponding to the FL group; area information corresponding to the FL group; network slice information corresponding to the FL group; data network information corresponding to the FL group.

Optionally, the determining the second functional entity according to the characteristic information of the FL group includes: determining the second functional entity that meets a second condition, according to the characteristic information of the FL group; where the second condition includes one or a combination of the following conditions: supporting the application or service corresponding to the FL group; serving the data network, network slice or area corresponding to the FL group; accessing the data network or network slice corresponding to the FL group; located in the area corresponding to the FL group; and the identification information being included in the identification information of the functional entities allowed to join the FL group.

In this way, it can be accurately determined whether the second functional entity can join the FL group. Regarding "serving the data network, network slice or area corresponding to the FL group" may be for the second functional entity being NF; regarding "accessing the data network or network slice corresponding to the FL group" may be for the second function The entity is a UE, specifically, the PDU session is established under the data network or network slice corresponding to the FL group.

Further, before joining the FL group, the method further includes: sending a first query request to the fourth functional entity, where the first query request carries third information of the FL group; receiving a first query response sent by the fourth functional entity, where the first query response carries information of at least one first functional entity that satisfies the third information; based on the information of the at least one first functional entity, determining from the at least one first functional entity, the first functional entity that is to establish the FL group with the second functional entity; where the third information of the FL group includes at least one of the following: information of application or service corresponding to the FL group; network slice information corresponding to the FL group; data network information corresponding to the FL group; information of a machine learning (ML) model of the FL group.

The information of the first functional entity includes at least one of: address information, location information and service area information of the first functional entity; where based on the information of the at least one first functional entity, determining from the at least one first functional entity, the first functional entity that is to establish the FL group with the second functional entity includes: based on the information of the at least one first functional entity, selecting the first functional entity that satisfies a third condition from the at least one first functional entity as the first functional entity to establish the FL group with the second functional entity; where the third condition includes at least one of the following: belonging to a same local network as the second functional entity; serving an area where the second functional entity is located; and having a shortest distance to the second functional entity among the at least one first functional entity.

The first functional entity with better performance when interacting with the second functional entity can be obtained.

In the embodiment of the present disclosure, joining the FL group includes: sending a second FL joining request to a first functional entity, where the second FL joining request is configured to request to join the FL group, the second FL joining request carries information of the first functional information and the first information of the FL group; receiving a second FL joining response sent by the first functional entity.

This enables the second functional entity to actively join the FL group.

Further, the method further includes: storing second information of the FL group, where the second information includes one or more of the following: information of the first functional entity; information of the second functional entity; identification information of the FL group; information of application or service corresponding to the FL group; network slice information corresponding to the FL group; data network information corresponding to the FL group; and information of a machine learning (ML) model of the FL group.

Regarding "storage", it can be the storage when the FL group is created, or when a new functional entity is added to the FL group; or the storage when the FL group is updated (such as updating the second information of the FL group), which is not limited here.

The information of the first functional entity includes one or more of: identification information, address information and location information of the first functional entity; or, the information of the second functional entity includes one or more of: identification information, address information and location information of the second functional entity.

This can facilitate precise operations on the first functional entity and the second functional entity.

Further, subsequent to joining the FL group, the federated learning group processing method further includes: determining whether the second functional entity meets conditions for leaving the FL group; when the second functional entity meets the conditions for leaving the FL group, sending a first FL leaving request to the first functional entity, where the first FL leaving request is configured to request to leave the FL group; when the second functional entity meets the conditions for leaving the FL group, leaving the FL group, where the leaving the FL group comprises: sending a first FL leaving request to the first functional entity, where the first FL leaving request is configured to request to leave the FL group.

In this way, the second functional entity can be removed from the FL group.

The second functional entity meeting the conditions for leaving the FL group includes one or more of the following situations: the second functional entity no longer supports the application or service corresponding to the FL group; the second functional entity no longer serves the data network, the network slice or the area corresponding to the FL group; the second functional entity no longer accesses the data network or the network slice corresponding to the FL group; and the second functional entity leaves the area corresponding to the FL group.

Regarding "the second functional entity no longer serves the data network, network slice or area corresponding to the FL group", it may be that the second functional entity is NF; regarding "the second functional entity no longer accesses the data network or network slice corresponding to the FL group" may be directed to the second functional entity being the UE, specifically releasing the PDU session established under the data network or network slice corresponding to the FL group.

In the embodiment of the present disclosure, the method further includes: receiving updated characteristic information of the FL group sent by the third functional entity; the determining whether the second functional entity meets the conditions for leaving the FL group includes: according to the updated characteristic information of the FL group, determining whether the second functional entity meets the conditions for leaving the FL group.

This enables third-party triggering to determine whether to remove the second functional entity from the FL group. The third functional entity may be an application functional entity, a network exposure functional entity or a policy control functional entity, which is not limited here.

Further, if the second functional entity meets the conditions for leaving the FL group, the method further includes: deleting the second information of the FL group stored in the second functional entity. Specifically, leaving the FL group may further include deleting the second information of the FL group stored in the second functional entity.

In this way, the relevant information about the FL group is real-time and accurate.

The embodiment of the present disclosure also provides a federated learning group processing method, which is applied to the third functional entity. As shown in FIG. 4, the method includes:

Step 41: sending a first request or a second request to a first functional entity; where the first request carries application information or service information related to a federated learning (FL) group, and the second request carries a control policy related to the FL group, to enable the first functional entity to establish or update the FL group according to the application information, the service information or the control policy related to the FL group.

The third functional entity may be an application functional entity, a network exposure functional entity or a policy control functional entity, which is not limited here.

According to the embodiment of the present disclosure sends a first request or a second request to the first functional entity; where the first request carries application information or service information related to the federated learning (FL) group, and the second request carries the control policy related to the federated learning (FL) group, so that the first functional entity can create or update the FL group according to apply information, service information or control policies related to the FL group, thereby dynamically processing the FL group, better meeting the needs of network and service intelligence, and improving the intelligent performance of communications and applications.

The application information, the service information or the control policy related to the FL group includes: the characteristic information of the FL group. The characteristic information of the FL group includes first information, and/or identification information of functional entities allowed to join the FL group; the first information includes any one or more of the following: information of application or service corresponding to the FL group; area information corresponding to the FL group; network slice information corresponding to the FL group; data network information corresponding to the FL group.

This allows for more accurate processing of the FL group.

It should be noted here that the names of the above-mentioned requests, responses or information can be adjusted according to their roles or functions. For example, the first FL joining request can be adjusted to a FL group joining request, a FL group joining request, and a FL group joining request. etc., are not limited in the embodiments of this disclosure. Moreover, it can be adapted to the names of similar processes or content involved in the following examples, rather than simply being different because of different literal names; for example, the first FL leaving request mentioned above can be the same as the following federated learning leaving request, more specific, can be consistent, but are not limited to this.

The following is an example of the federated learning group processing method provided by the embodiment of the present disclosure. The first functional entity takes the network data analysis function NWDAF (entity) as an example, and the second functional entity takes the network function NF (entity) or the terminal UE. For example, the third functional entity is Application function (AF) (entity), Network Exposure Function (NEF) (entity) or Policy Control Function (PCF) (entity) As an example, the fourth functional entity takes Network Repository Function (NRF) (entity) as an example.

In order to achieve the above objectives, embodiments of the present disclosure provide a federated learning group processing method, for which specific examples are given below. In the following examples:

1. The first functional entity has the federated learning management function (or called the federated learning group management function FLMF: FL (Group) Management Function). The following takes NWDAF, which provides a global model, as an example. However, the federated learning management function is not limited to NWDAF that provides a global model, but can also be other network functions, such as other network functions that provide a global model, or network functions dedicated to federated learning management.

2. The first functional entity may be the network function NF or the user equipment UE. Network functions NF include core network functions and/or access network functions.

3. AF can be untrusted AF or trusted AF. If the AF is a trusted AF, the AF in Examples 3 and 4 can communicate directly with the Unified Data Repository (UDR), NWDAF, etc. without going through NEF.

Figure 5:
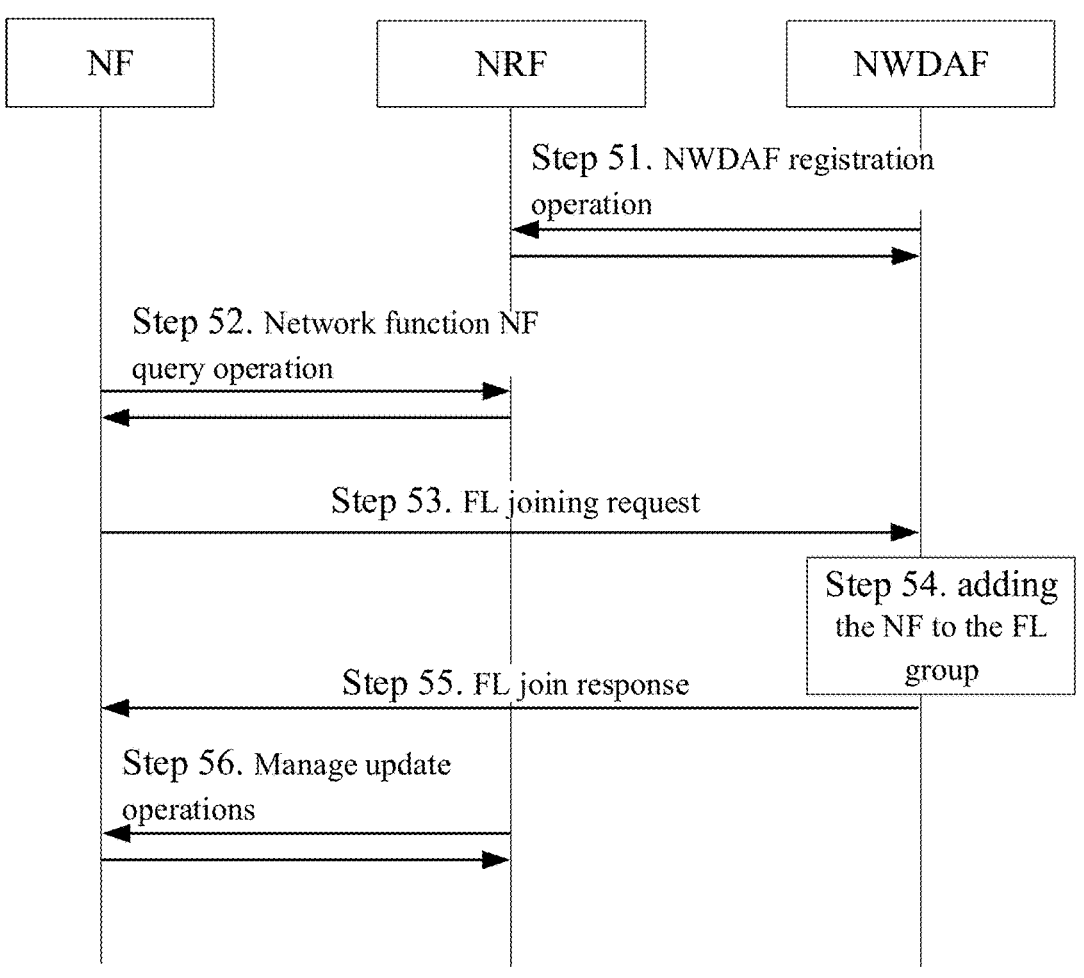
FIG. 5 is a schematic flowchart 1 of the specific implementation of the federated learning group processing method according to the embodiment of the present disclosure.

Example 1: Network function NF initiates joining the federated learning (FL) group;

Specifically, as shown in FIG. 5 (the second functional entity takes NF as an example), the method includes:

Step 51. NWDAF registration operation;

(1) NWDAF sends a registration request to the network database function NRF to register its own information (NWDAF profile). If NWDAF supports Federated Learning (FL), it can include the following FL-related information:

1) NWDAF's FL capabilities, including specific information about FL supported by NWDAF, for example: for each FL global model that NWDAF can provide, its applicable applications, services or scenarios (such as image recognition, remote control, Internet of Vehicles communications (such as image recognition, remote control, Internet of Vehicles communications) Vehicle to Everything (V2X), etc.), area, time period, model type (such as a specific deep neural network type), and/or, accuracy or confidence level, etc.;

2) FL group information managed by NWDAF, such as FL Group ID.

In addition, NWDAF can also register the following information for other NFs to discover the local NWDAF:

1) NWDAF location information, including operator-specific location information, such as geographical location information or data center information.

2) NWDAF IP address information, such as: NWDAF I Pv4 address and/or IPv6 network prefix (I p v6 network prefix).

(2) NRF feeds back the registration response to NWDAF.

Step 52. Network function NF query operation;

(1) The network function NF sends a query request to the NRF. The query request indicates that the target NF type is NWDAF and carries the following information:

FL characteristic information determined according to the federated learning policies, such as FL applicable applications (or service or scenarios), areas, time periods, model types, and/or, accuracy or confidence levels, etc.; and/or, 2) FL Group ID, if NF has learned this information through previous processes or pre-configuration.

In addition, the query request may also include query instructions for NWDAF location information or IP address information.

(2) NRF returns a query response according to the query request, which can include information about NWDAF that meets the conditions (that is, supports the requested FL). The NWDAF information can also include information about the corresponding FL Group, such as FL Group ID. Based on the query request, NWDAF information and/or NRF local policy, NRF may also provide NWDAF location information and/or IP address information in the query response.

Subsequently, the NF can select a NWDAF that supports the requested FL based on the query response. If the query response contains the NWDAF's location information and/ or IP address information, the NF can select a local NWDAF that supports the requested FL to speed up the FL process.

Step 53. NF sends a federated learning joining request (FL join request) to the selected NWDAF, which carries the NF identification (NF ID) and the FL group identification requested to join (if NF has learned this information through the previous process or pre-configuration) or FL characteristic information, request NWDAF to add it to the corresponding FL group.

Step 54. NWDAF adding the NF to the FL group. Specifically, the information of the NF (such as NF ID) is added to the FL group context (FL group context) stored by NWDAF.

The FL group context in NWDAF may contain at least one of the following information:

(1) FL group ID;

(2) Group member identification (Identity, ID) list, that is, the list of NFs added to the FL group;

(3) Global model information provided by NWDAF to NF in the FL group, such as global model file address or global model parameter list;

(4) The NF in the FL group provides information about the local model (local model) of NWDAF, such as the file address of the local model or the parameter list of the local model. This information can be used in scenarios where NWDAF stores local model information of multiple NFs and uses these models to retrain the global model.

(5) FL characteristic information.

Step 55. NWDAF sends a federated learning join accept (FL join accept) message (i.e., FL join response) to NF, which can carry FL group identification, global model information, etc.

Step 56. Manage update operations;

(1) NF sends an NF information update request to NRF, and adds the information of the above-mentioned FL group that NF has joined, such as the FL group identifier and the identifier of the FL group management function (here, NWDAF ID), to the NF profile (configuration file). Subsequent network functions such as AF, PCF or NWDAF can use this information to discover all or some NFs that join a specific FL group (such as NFs that join the FL group in a specific area), thereby requesting or executing the ML model transmission status of the FL group or Analysis of model performance.

(2) NRF feeds back the update response to NF.

Figure 6:
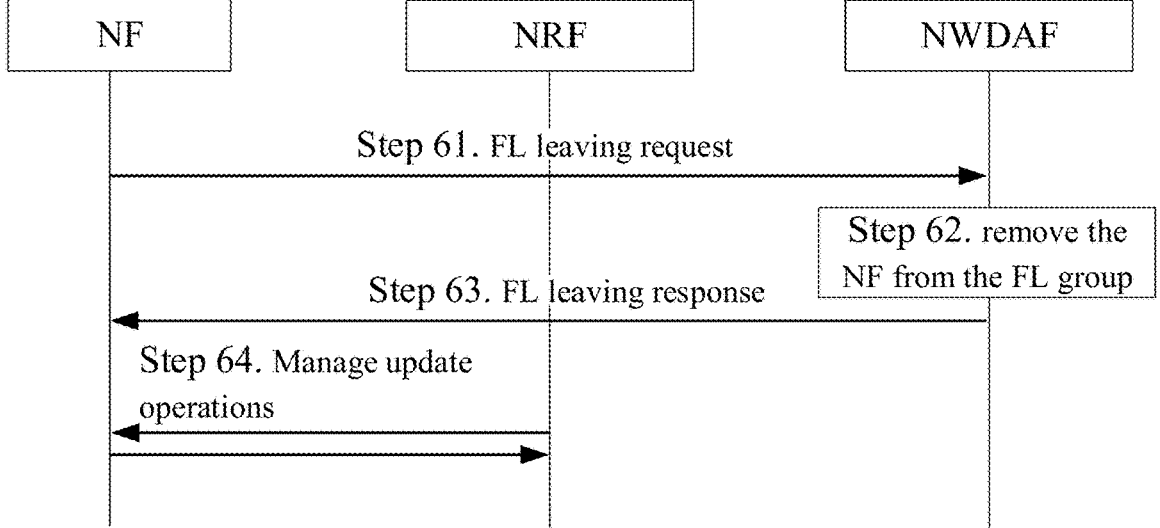
FIG. 6 is a schematic flowchart 2 of the specific implementation of the federated learning group processing method according to the embodiment of the present disclosure.

Example 2: NF initiates leaving the FL group;

Specifically, as shown in FIG. 6 (the second functional entity takes NF as an example), the method includes:

Step 61. NF sends a federated learning leaving request (FL leave request) to NWDAF, which carries the NF identification (NF ID) and the FL group identification requesting to leave.

Step 62. According to the received federated learning leaving request of the NF, the NWDAF removes the NF from the FL group; specifically, it can be: removing the information of the NF (such as NF ID) from the FL group to identify the corresponding FL group context. (FL group context).

Step 63. NWDAF sends a federated learning leave accept (FL leave accept) message to NF, that is, FL leaving response.

Step 64. Manage update operations;

(1) NF sends an NF information update request to NRF to delete the information of the FL group that NF left (such as FL group identification and FL group management function identification) from the NF profile.

(2) NRF feeds back the update response to NF.

Example 3: Other NF (such as AF or NWDAF) initiates adding the NF to the FL group (if the AF is a trusted AF, the AF can communicate directly with UDR (unified database), NWDAF, etc., without going through NEF);

The network can initiate the establishment of a specific FL group (that is, add the first member to the FL group) based on application requirements and/or network policies, or request NF to join a specific FL group. FIGS. 7, 8, 9 and 14 provide four possible processes.

Figures 7, 8:
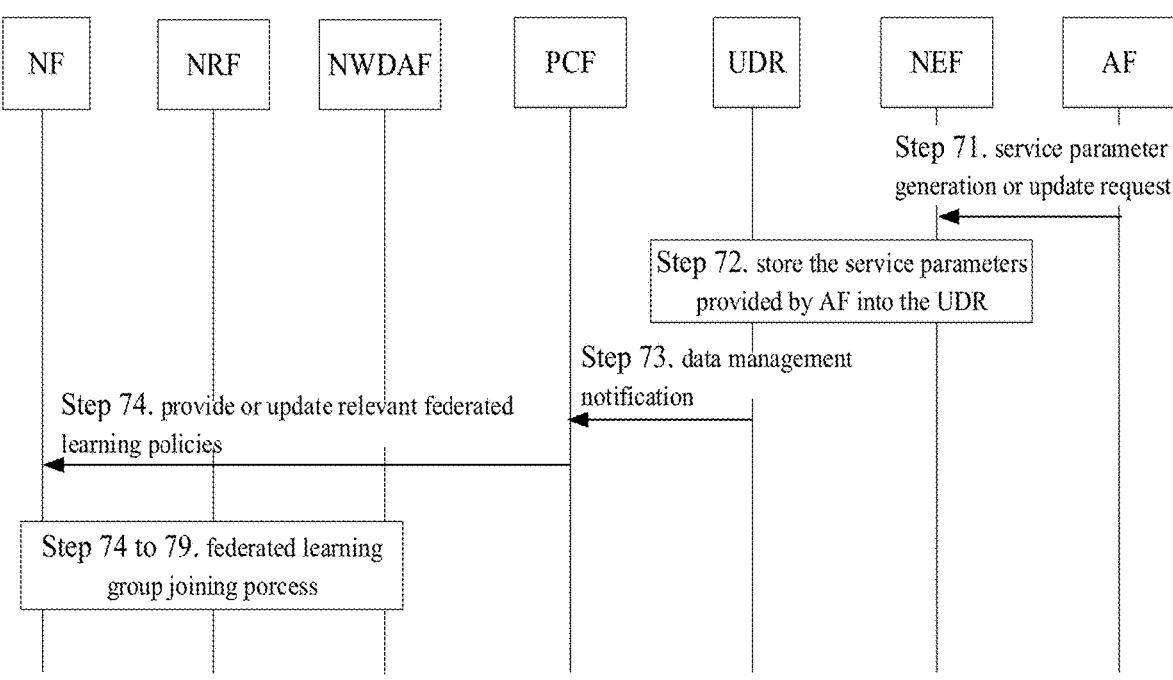
FIG. 7 is a schematic flowchart 3 of the specific implementation of the federated learning group processing method according to the embodiment of the present disclosure.
FIG. 8 is a schematic flowchart 4 of the specific implementation of the federated learning group processing method according to the embodiment of the present disclosure.

The first type, specifically, can be shown in FIG. 7. The method includes:

Step 71. AF initiates a service parameter generation or update request (i.e., Nnef_ServiceParameter_Create or Nnef_ServiceParameter_Update) to NEF to generate or update service parameters, including service or application-related federated learning parameters, such as: Application ID that requires federated learning, terminal identification UE ID list or terminal group identification UE Group ID, area, single network slice selection assistance information (Single Network Slice Selection Assistance Information, S-NSSAI), data network name (Data Network Name, DNN), application features and other information.

Step 72. NEF stores the service parameters provided by AF into the UDR, including the above-mentioned service or application-related federated learning parameters. That is, UDR stores FL related parameters.

Step 73. The UDR sends the data management it notification Nudr_DM_Notify to the PCF, which includes the federated learning parameters related to the above services or applications.

Step 74. The PCF provides or updates relevant federated learning policies to the UE or other NFs (such as AMF, SMF) based on the above-mentioned service or application-related federated learning parameters, and requires the UE or other NFs to join the corresponding federated learning group. For example:

a) Send an updated UE policy (UE policy) to the corresponding UE based on the UE ID list or UE Group ID, which carries the federated learning policy determined based on the federated learning parameters related to the above services or applications, which may include: requests for federated learning Information such as Application ID, area, S-NS-SAI, DNN, application characteristics, etc. may also include identification information of UEs allowed to join the federated learning group (such as UE Group ID).

b) Send an updated access and mobility management policy (AM policy) to the AMF, which carries the federated learning policy related to access and mobility management functions determined based on the federated learning parameters related to the above services or applications, which may include: Enter the UE ID list or UE Group ID, area, S-NSSAI, DNN and other information for management by federated learning related to the mobile management function. It can also include the identification information of the AMF that is allowed to join the federated learning group (such as the AMF set identification AMF Set ID).

c) Send an updated session management policy (SM policy) to SMF, which carries the federated learning policy related to the session management function determined based on the federated learning parameters related to the above service or application, which may include: federated learning related to the session management function The Application ID, UE ID list or UE Group ID, area, S-NSSAI, DNN and other information corresponding to the managed PDU session can also include the identification information of the SMF that is allowed to join the federated learning group (such as SMF Set ID).

Here, the UE or other NF (such as AMF, SMF) has a federated learning function. Other NFs are relative to NWDAF.

Before sending the federated learning policies, PCF can query NRF for information about the NF (such as AMF, SMF) that supports the federated learning. That is: PCF sends an NF discovery request Nnrf_NFDiscovery_Request to NRF, which carries one or more of the above service or application-related federated learning parameters, such as federated learning Application ID, UE ID list or UE Group ID, area, S-NSSAI, DNN, application features (Features), etc., based on which NRF replies to PCF with NF information that supports the federated learning (such as NF type, NF instance ID, etc.).

After receiving the federated learning policies provided by PCF, the UE or other NF (such as AMF, SMF) performs the following steps according to the federated learning policies provided by PCF:

Step 75. UE or other NF query operation;

(1) The UE or other NF sends a query request to the NRF. The query request indicates that the target NF type is NWDAF and carries the following information:

1) FL characteristic information determined according to the federated learning policies, such as FL applicable applications (or service or scenarios), areas, time periods, model types, and/or, accuracy or confidence levels, etc.; and/or, 2) FL Group ID, if the UE or other NF has learned this information through the previous process or pre-configuration.

In addition, the query request may also include query instructions for NWDAF location information or IP address information.

(2) NRF returns a query response according to the query request, which can include information about NWDAF that meets the conditions (that is, supports the requested FL). The NWDAF information can also include information about the corresponding FL Group, such as FL Group ID. Based on the query request, NWDAF information and/or NRF local policy, NRF may also provide NWDAF location information and/or IP address information in the query response.

Subsequently, the UE or other NF can select a NWDAF that supports the requested FL based on the query response. If the query response contains the location information and/or IP address information of the NWDAF, the UE or other NF can select a local NWDAF that supports the requested FL to speed up the FL process.

Step 76. The UE or other NF sends a federated learning joining request (FL join request) to the selected NWDAF, which carries the NF identification (NF ID) and the FL group identification requested to join (if the UE or other NF passes the previous process or pre- The configuration has learned this information) or FL characteristic information, and requests NWDAF to add it to the corresponding FL group.

Before performing steps 75 or 76, if the federated learning policy provided by the PCF contains the identification information of the UE or NF that is allowed to join the federated learning group, the UE or other NF can also confirm whether it is allowed to join the federated learning group based on this information. If so, performing steps 75, 76 and subsequent steps.

Step 77. NWDAF adds the UE or other NF to the FL group. Specifically, the information of the UE or other NF (such as NF ID) is added to the FL group context (FL group context) stored by NWDAF.

The FL group context in NWDAF may contain at least one of the following information:

(1) FL group ID;

(2) Group member ID list, that is, the list of NFs joining the FL group;

(3) Global model information provided by NWDAF to NF in the FL group, such as global model file address or global model parameter list;

(4) The NF in the FL group provides information about the local model (local model) of NWDAF, such as the file address of the local model or the parameter list of the local model. This information can be used in scenarios where NWDAF stores local model information of multiple NFs and uses these models to retrain the global model.

(5) FL characteristic information.

Step 78. NWDAF sends a federated learning join accept (FL join accept) message (i.e., FL join response) to the UE or other NF, which can carry the FL group identifier, global model information, etc.

Step 79. Manage update operations;

(1) NF sends an NF information update request to NRF, and adds the information of the above-mentioned FL group that NF has joined, such as the FL group identifier and the identifier of the FL group management function (here is the NWDAF ID), to the NF profile (configuration file). Subsequent network functions such as AF, PCF or NWDAF can use this information to discover all or some NFs that join a specific FL group (such as NFs that join the FL group in a specific area), thereby requesting or executing the ML model transmission status of the FL group or Analysis of model performance. The NF here is consistent with the other NF above.

(2) NRF feeds back the update response to NF.

That is, after step 74, the UE or other NF (such as AMF, SMF) initiates the federated learning group joining process to the NWDAF according to the federated learning policies provided by the PCF. The steps are similar to steps 52-56 in Example 1, where the FL characteristic information Comprising one or more of the above service or application-related federated learning parameters, such as federated learning Application ID, UE ID list or UE Group ID, area, S-NSSAI, DNN, application features, etc.

The second type, specifically, can be shown in FIG. 8. The method includes:

Step 81. AF initiates a service parameter generation or update request (i.e. Nnef_ServiceParameter_Create or Nnef_ServiceParameter_Update) to NEF to generate or update service parameters, including service or application-related federated learning parameters, such as: Application ID that requires federated learning, terminal identification UE ID list or terminal group identification UE Group ID, area, single network slice selection auxiliary information S-NSSAI, data network name DNN, application features (Features) and other information.

Step 82. NEF stores the service parameters provided by AF into the UDR, including the above-mentioned service or application-related federated learning parameters. That is, UDR stores FL related parameters.

Step 83. The UDR sends the data management notification Nudr_DM_Notify to the PCF, which includes the federated learning parameters related to the above services or applications.

Step 84. The PCF provides or updates the federated learning policies to the NWDAF, which carries the federated learning parameters related to the above services or applications. Before sending the federated learning policies, PCF can query NRF for information about the NWDAF that supports the federated learning, similar to step 52 in FIG. 5 (only the initiator is PCF), where the FL characteristic information includes one or more of the above service or application-related Federated learning parameters, such as federated learning Application ID, UE ID list or UE Group ID, area, S-NSSAI, DNN, application features (Features), etc., based on which NRF replies to PCF with NWDAF information that supports the federated learning (such as NWDAF Instance ID, etc.).

Step 85. The NWDAF initiates a federated learning request to the UE or other NF (eg AMF, SMF) based on the received federated learning policy. For example:
- a) NWDAF sends a federated learning request to the corresponding UE based on the UE ID list or UE Group ID, which carries FL characteristic information, including the federated learning Application ID, area, S-NSSAI, DNN, application features (Features) and other information, indicating the UE joins the federated learning group of the relevant service or application;
- b) NWDAF sends a federated learning request to AMF, which carries FL characteristic information, including federated learning UE ID list or UE Group ID, area, S-NSSAI, DNN and other information, instructing AMF to join the federated learning groups related to access management and/or mobility management;
- c) NWDAF sends a federated learning request to SMF, which carries FL characteristic information, including the Application ID, UE ID list or UE Group ID, area, S-NSSAI, DNN and other information corresponding to the federated learning PDU session, instructing SMF to join the relevant conversation management federated learning groups.

Here, the UE or other NF (such as AMF, SMF) has a federated learning function.

Before sending a federated learning request, NWDAF can query NRF for information about the NF (such as AMF, SMF) that supports the federated learning. For example: NWDAF sends an NF discovery request Nnrf_NFDiscovery_Request to NRF, which carries one or more of the above service or application-related federated learning parameters, such as federated learning Application ID, UE ID list or UE Group ID, area, S-NSSAI, DNN, application features (Features), etc., based on which NRF replies to NWDAF with the NF information that supports the federated learning (such as NF type, NF instance ID, etc.).

Step 86. The UE or other NF sends a federated learning joining request (FL join request) to the NWDAF, which carries the NF identification (NF ID) and the FL group identification requested to join (if the UE or other NF has learned it through the previous process or pre-configuration) This information) or FL characteristic information, request NWDAF to add it to the corresponding FL group.

Step 87. NWDAF adds the UE or other NF to the FL group. Specifically, the information of the UE or other NF (such as NF ID) is added to the FL group context (FL group context) stored by NWDAF.

The FL group context in NWDAF may contain at least one of the following information:
- (1) FL group ID;
- (2) Group member ID list, that is, the list of NFs joining the FL group;
- (3) Global model information provided by NWDAF to NF in the FL group, such as global model file address or global model parameter list;
- (4) The NF in the FL group provides information about the local model (local model) of NWDAF, such as the file address of the local model or the parameter list of the local model. This information can be used in scenarios where NWDAF stores local model information of multiple NFs and uses these models to retrain the global model.
- (5) FL characteristic information.

Step 88. NWDAF sends a federated learning join accept (FL join accept) message (i.e., FL join response) to the UE or other NF, which can carry the FL group identifier, global model information, etc.

Step 89. Management of update operations;
- (1) NF sends an NF information update request to NRF, and adds the information of the above-mentioned FL group that NF has joined, such as the FL group identifier and the identifier of the FL group management function (here, NWDAF ID), to the NF profile (configuration file). Subsequent network functions such as AF, PCF or NWDAF can use this information to discover all or some NFs that join a specific FL group (such as NFs that join the FL group in a specific area), thereby requesting or executing analysis of the ML model transmission status of the FL group or model performance thereof. The NF here is consistent with the other NF above.
- (2) NRF feeds back the update response to NF.

That is, after step 85, the UE or other NF (such as AMF, SMF) initiates the adding process of the corresponding federated learning group to the NWDAF according to the federated learning request of the NWDAF. The steps are similar to steps 53-56 of Example 1, where the FL characteristic information includes one or more federated learning parameters related to the above services or applications, such as federated learning Application ID, UE ID list or UE Group ID, area, S-NSSAI, DNN, application features (Features), etc.

The third type, specifically, can be shown in FIG. 9. The method includes:

Step 91. AF initiates a federated learning request to NEF, which includes service or application-related federated learning parameters, such as: Application ID, UE ID list or UE Group ID, area, S-NSSAI, DNN, and application characteristics that require federated learning. (Features) and other information.

Step 92. NEF performs authorization check on the federated learning request of AF based on the service agreement, operator policy, etc. If the request is authorized, NEF queries the relevant NWDAF and sends a federated learning request to NWDAF, which carries the federated learning parameters related to the above services or applications. The process of NEF querying NWDAF is similar to step 52 in FIG. 5 (except that the initiator is NEF), where the FL characteristic information includes the federated learning parameters related to the above services or applications.

Step 93. The NWDAF initiates a federated learning request to the UE or other NF (such as AMF, SMF) based on the received federated learning request. For example:

a) NWDAF sends a federated learning request to the corresponding UE based on the UE ID list or UE Group ID, which carries FL characteristic information, including the federated learning Application ID, area, S-NSSAI, DNN, application features (Features) and other information, indicating The UE joins the federated learning group of the relevant service or application;

b) NWDAF sends a federated learning request to AMF, which carries FL characteristic information, including federated learning UE ID list or UE Group ID, area, S-NSSAI, DNN and other information, instructing AMF to join relevant access management and/or mobility Federal Study Group on Sexuality Management;

c) NWDAF sends a federated learning request to SMF, which carries FL characteristic information, including the Application ID, UE ID list or UE Group ID, area, S-NSSAI, DNN and other information corresponding to the federated learning PDU session, instructing SMF to join the relevant Conversation-managed federated learning groups.

Here, the UE or other NF (such as AMF, SMF) has a federated learning function.

Before sending a federated learning request, NWDAF can query NRF for information about the NF (such as AMF, SMF) that supports the federated learning. For example: NWDAF sends an NF discovery request Nnrf_NFDiscovery_Request to NRF, which carries one or more of the above service or application-related federated learning parameters, such as federated learning Application ID, UE ID list or UE Group ID, area, S-NSSAI, DNN, application features (Features), etc., and NRF replies to NWDAF accordingly with the NF information that supports the federated learning (such as NF type, NF instance ID, etc.).

Step 94. The UE or other NF sends a federated learning joining request (FL join request) to the NWDAF, which carries the NF identification (NF ID) and the FL group identification requested to join (if the UE or other NF has learned it through the previous process or pre-configuration) This information) or FL characteristic information, request NWDAF to add it to the corresponding FL group.

Step 95. NWDAF adds the UE or other NF to the FL group. Specifically, the information of the UE or other NF (such as NF ID) is added to the FL group context (FL group context) stored by NWDAF.

Among them, the FL group context in NWDAF may contain at least one of the following information:

(1) FL group ID;

(2) Group member ID list, that is, the list of NFs added to the FL group;

(3) Global model information provided by NWDAF to NF in the FL group, such as global model file address or global model parameter list;

(4) The NF in the FL group provides information about the local model (local model) of NWDAF, such as the file address of the local model or the parameter list of the local model. This information can be used in scenarios where NWDAF stores local model information of multiple NFs and uses these models to retrain the global model.

(5) FL characteristic information.

Step 96. NWDAF sends a federated learning join accept (FL join accept) message (i.e., FL join response) to the UE or other NF, which can carry the FL group identifier, global model information, etc.

Step 97. Manage update operations;

(1) NF sends an NF information update request to NRF, and adds the information of the above-mentioned FL group that NF has joined, such as the FL group identifier and the identifier of the FL group management function (here, NWDAF ID), to the NF profile (configuration file). Subsequent network functions such as AF, PCF or NWDAF can use this information to discover all or some NFs that join a specific FL group (such as NFs that join the FL group in a specific area), thereby requesting or executing analysis of the ML model transmission status of the FL group or model performance thereof. The NF here is consistent with the other NF above.

(2) NRF feeds back the update response to NF.

That is, after step 93, the UE or other NF (such as AMF, SMF) initiates the adding process of the corresponding federated learning group to the NWDAF according to the federated learning request of the NWDAF. The steps are similar to steps 53-56 of Example 1, where the FL feature The information includes one or more federated learning parameters related to the above services or applications, such as federated learning Application ID, UE ID list or UE Group ID, area, S-NSSAI, DNN, application features (Features), etc.

The fourth type, specifically, can be shown in FIG. 1 4. This plan includes:

Step 141. The NWDAF determines to initiate a request to join federated learning or establish a federated learning group to the UE or other NF (such as AMF, SMF) based on external trigger conditions or local policies. For example NWDAF detects the following conditions:

1) The UE enters the FL area, or a specific NF state or function, such as NF serving the FL area;

That is, it is detected that the UE joins the FL area or the NF serves the FL area, and it is determined that the UE or other NF needs to join federated learning.

Step 142. NWDAF sends a request to join federated learning or establish a federated learning group to the relevant UE or other NF (such as AMF, SMF); including sending a request to join federated learning or establish a federated learning group to the following UE or other NF:

1) UE entering the FL area, or NF serving the FL area.

Step 143. The UE or NF that receives the request to join federated learning or establish a federated learning group sends a federated learning joining request (FL join request) to NWDAF, which carries the UE ID (UE ID) or NF ID (NF ID) and requests to join. FL group identifier (if the UE or other NF has learned this information through previous procedures or pre-configuration).

Step 144. According to the received federated learning joining request of the UE or NF, the NWDAF adds the UE or NF to the FL group; specifically, it can be: adding the information of the UE or NF (such as UE ID or NF ID) to the FL group context corresponding to the FL group identifier.

Step 145. NWDAF sends a federated learning join accept (FL join accept) message to the UE or NF, that is, a FL join response.

Step 146. Manage update operations;

(1) NF sends an NF information update request to NRF, and adds the information of the above-mentioned FL group that NF has joined (such as FL group identification, FL group management function identification (here, NWDAF identification)) to the NF profile.

(2) NRF feeds back the update response to NF.

Specifically, regarding steps 143 to 146: the UE or other NF that receives the request to join federated learning or establish a federated learning group initiates the process of joining the FL group (i.e., the federated learning group joining process); similar to steps 53-56 in FIG. 5.

Example 4: Other NF (such as AF or NWDAF) initiates the removal of the NF from the FL group (if the AF is a trusted AF, the AF can communicate directly with UDR (unified database), NWDAF, etc., without going through NEF);

The network can initiate the termination of a specific FL group (that is, the last member of the FL group leaves) or request the NF to leave a specific FL group based on application requirements and/or network policies. FIGS. 10, 11, 12 and 13 provide four possible processes.

The first type, specifically, can be shown in FIG. 10. The method includes:

Step 101. AF initiates a service parameter generation or update request (i.e., Nnef_ServiceParameter_Create or Nnef_ServiceParameter_Update) to NEF to generate or update service parameters, including service or application-related federated learning parameters, such as: Application ID and UE requesting to terminate federated learning. ID list or UE Group ID, area, S-NSSAI, DNN, application features (Features) and other information.

Step 102. NEF stores the service parameters provided by AF into the UDR, including the above-mentioned service or application-related federated learning parameters. That is, UDR stores FL related parameters.

Step 103. The UDR sends a data management notification Nudr_DM_Notify to the PCF, which includes the federated learning parameters related to the above services or applications.

Step 104. Based on the above service or application-related federated learning parameters, the PCF provides or updates the relevant federated learning policy to the UE or other NFs (such as AMF, SMF), and requires the UE or other NFs to terminate the relevant federated learning or leave the corresponding federated learning group (other NF is relative to NWDAF). For example:

a) Send an updated UE policy (UE policy) to the corresponding UE based on the UE ID list or UE Group ID, which carries the federated learning policy determined based on the federated learning parameters related to the above services or applications, which may include: requesting the termination of federated learning Application ID, area, S-NSSAI, DNN, application characteristics and other information.

b) Send an updated access and mobility management policy (AM policy) to AMF, which carries the federated learning policy related to access and mobility management functions determined based on the federated learning parameters related to the above services or applications, which may include: request for termination UE ID list or UE Group ID, area, S-NSSAI, DNN and other information managed using federated learning related to access management and/or mobility management functions.

c) Send an updated session management policy (SM policy) to SMF, which carries the federated learning policy related to the session management function determined based on the federated learning parameters related to the above service or application, which may include: requesting the termination of the use of the session management function. Information such as Application ID, UE ID list or UE Group ID, area, S-NSSAI, DNN and other information corresponding to the PDU session managed by federated learning.

Before sending the federated learning policies, PCF can query NRF for information about NFs (such as AMF, SMF) that have joined the federated learning group.

Step 105. The UE or NF that receives the request to terminate federated learning or leave the federated learning group sends a federated learning leaving request (FL leave request) to NWDAF, which carries the UE ID (UE ID) or NF ID (NF ID), requesting to leave. The FL group identifier.

Step 106. According to the received federated learning leaving request of the UE or NF, the NWDAF removes the UE or NF from the FL group; specifically, it can be: the UE's information (such as UE ID) or the NF's information (For example, NF ID) is deleted from the FL group context (FL group context) corresponding to the FL group identifier.

Step 107. The NWDAF sends a federated learning leave accept (FL leave accept) message to the UE or NF, that is, a FL leaving response.

Step 108. Manage update operations;

(1) The NF sends an NF information update request to the NRF to delete the information of the above-mentioned FL group that the UE or NF left (such as the FL group identifier, the identifier of the FL group management function (here, the NWDAF identifier)) from the NF profile.

(2) NRF feeds back the update response to NF.

Specifically, 1. Steps 101 to 104 are similar to steps 71-74 in FIG. 7, with the following differences:

1) The service or application-related federated learning parameters provided by AF include: Application ID, UE ID list or UE Group ID, area, S-NSSAI, DNN, application features (Features) and other information that require the termination of federated learning.

2) PCF provides or updates relevant federated learning policies to UE or other NFs (such as AMF, SMF) based on the above-mentioned service or application-related federated learning parameters, and requires UE or other NFs to terminate related federated learning or leave the corresponding federated learning. Group. For example:

a) Send an updated UE policy (UE policy) to the corresponding UE based on the UE ID list or UE Group ID, which carries the federated learning policy determined based on the federated learning parameters related to the above services or applications, which may include: requesting the termination of federated learning Application ID, area, S-NSSAI, DNN, application characteristics and other information.

b) Send an updated access and mobility management policy (AM policy) to AMF, which carries the federated learning policy related to access and mobility management functions determined based on the federated learning parameters related to the above services or applications, which may include: request for termination UE ID list or UE Group ID, area, S-NSSAI, DNN and other information managed using federated learning related to access management and/or mobility management functions.

c) Send an updated session management policy (SM policy) to SMF, which carries the federated learning policy related to the session management function determined based on the federated learning parameters related to the above service or application, which may include: requesting the termination of the use of the session management function. Information such as Application ID, UE ID list or UE Group ID, area, S-NSSAI, DNN and other information corresponding to the PDU session managed by federated learning.

Before sending the federated learning policy, the PCF can query the NRF for information about UEs or other NFs (such as AMF, SMF) that have joined the federated learning group.

2. About steps 105 to 108: The UE or other NF that receives the request to terminate federated learning or leave the federated learning group initiates the process of leaving the FL group (that is, the federated learning group leaving process); similar to steps 61-64 in FIG. 6.

Figure 11:
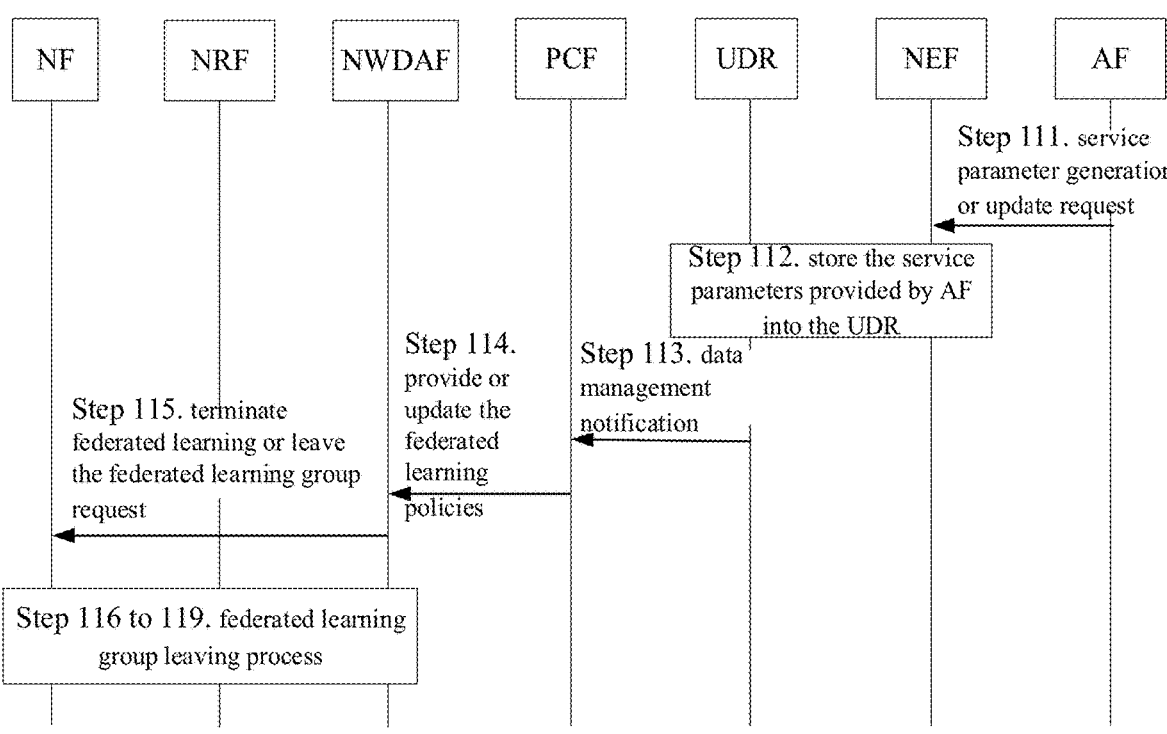
FIG. 11 is a schematic flowchart 7 of the specific implementation of the federated learning group processing method according to the embodiment of the present disclosure.

The second type, specifically, can be shown in FIG. 11. The method includes:

Step 111. AF initiates a service parameter generation or update request (i.e. Nnef_ServiceParameter_Create or Nnef_ServiceParameter_Update) to NEF to generate or update service parameters, including service or application-related federated learning parameters, such as: Application ID and UE requesting to terminate federated learning. ID list or UE Group ID, area, S-NSSAI, DNN, application features (Features) and other information.

Step 112. NEF stores the service parameters provided by AF into the UDR, including the above-mentioned service or application-related federated learning parameters. That is, UDR stores FL related parameters.

Step 113. UDR sends data management notification Nudr_DM_Notify to PCF, which includes the federated learning parameters related to the above services or applications.

Step 114. PCF provides or updates the federated learning policies to NWDAF, which carries the federated learning parameters related to the above services or applications.

Step 115. Based on the received federated learning policy, NWDAF initiates a request to the UE or other NFs (such as AMF, SMF) to terminate federated learning or leave the federated learning group (other NFs are relative to NWDAF). For example:

a) NWDAF sends a request to terminate federated learning or leave the federated learning group to the corresponding UE based on the UE ID list or UE Group ID, which carries the federated learning Application ID, area, S-NSSAI, DNN, application features (Features) and other information, Instruct the UE to leave the federated learning group of the relevant service or application;

b) NWDAF sends a request to terminate federated learning or leave the federated learning group to AMF, which carries the federated learning UE ID list or UE Group ID, area, S-NSSAI, DNN and other information, instructing AMF to leave the relevant access management and/or Federated Learning Group for Mobility Management;

c) NWDAF sends a request to SMF to terminate federated learning or leave the federated learning group, which carries the Application ID, UE ID list or UE Group ID, area, S-NSSAI, DNN and other information corresponding to the federated learning PDU session, instructing SMF to leave the relevant Session-managed federated learning groups.

Step 116. The UE or NF that receives the request to terminate federated learning or leave the federated learning group sends a federated learning leaving request (FL leave request) to NWDAF, which carries the UE identification (UE ID) or NF identification (NF ID), requesting to leave. The FL group identifier.

Step 117. According to the received federated learning leaving request of the UE or NF, the NWDAF removes the UE or NF from the FL group; specifically, it can be: the information of the UE (such as UE ID) or the information of the NF (For example, NF ID) is deleted from the FL group context (FL group context) corresponding to the FL group identifier.

Step 118. The NWDAF sends a federated learning leave accept (FL leave accept) message to the UE or NF, that is, a FL leaving response.

Step 119. Manage update operations;

(1) NF sends an NF information update request to NRF to delete the information of the FL group that NF left (such as FL group identification, FL group management function identification (here, NWDAF identification)) from the NF profile.

(2) NRF feeds back the update response to NF.

Specifically, steps 111 to 115 are similar to steps 81-85 in FIG. 8, with the following differences:

1) The service or application-related federated learning parameters provided by AF include: Application ID, UE ID list or UE Group ID, area, S-NSSAI, DNN, application features (Features) and other information that require the termination of federated learning.

2) Based on the received federated learning policy, NWDAF initiates a request to the UE or other NF (such as AMF, SMF) to terminate federated learning or leave the federated learning group. For example:

a) NWDAF sends a request to terminate federated learning or leave the federated learning group to the corresponding UE based on the UE ID list or UE Group ID, which carries the federated learning Application ID, area, S-NSSAI, DNN, application features (Features) and other information, Instruct the UE to leave the federated learning group of the relevant service or application;

b) NWDAF sends a request to terminate federated learning or leave the federated learning group to AMF, which carries the federated learning UE ID list or UE Group ID, area, S-NSSAI, DNN and other information, instructing AMF to leave the relevant access management and/or Federated Learning Group for Mobility Management;

c) NWDAF sends a request to SMF to terminate federated learning or leave the federated learning group, which carries the Application ID, UE ID list or UE Group ID, area, S-NSSAI, DNN and other information corresponding to the federated learning PDU session, instructing SMF to leave the relevant Session-managed federated learning groups.

2. Regarding steps 116 to 119: the UE or other NF that receives the request to terminate federated learning or leave the federated learning group initiates the process of leaving the FL group (i.e., the federated learning group leaving process); similar to steps 61-64 in FIG. 6.

Figure 12:
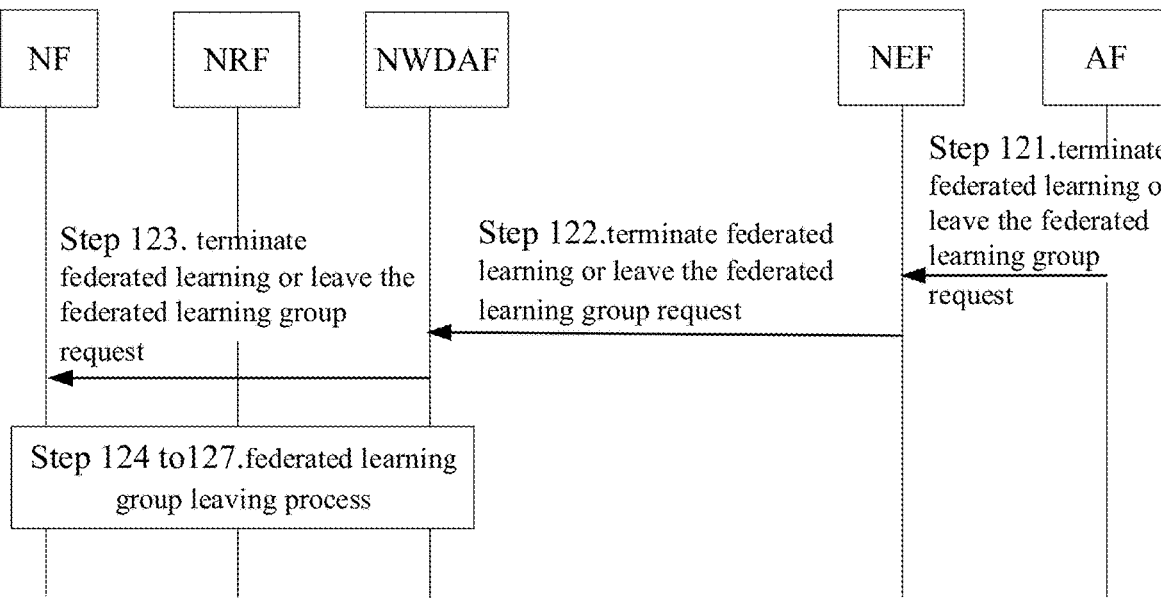
FIG. 12 is a schematic flowchart 8 of the specific implementation of the federated learning group processing method according to the embodiment of the present disclosure.

The third type, specifically, can be shown in FIG. 12. The method includes:

Step 121. AF initiates a request to NEF to terminate federated learning or leave the federated learning group, which includes service or application-related federated learning parameters, such as: Application ID, UE ID list or UE Group ID, area, S-NSSAI, DNN, application features (Features) and other information.

Step 122. NEF performs authorization check on the request of AF based on the service agreement, operator policy, etc. If the request is authorized, NEF queries the relevant NWDAF and sends a request to terminate federated learning or leave the federated learning group to NWDAF, which carries the federated learning parameters related to the above services or applications. The process of NEF querying NWDAF is similar to step 52 in FIG. 5 (except that the initiator is NEF), where the FL characteristic information includes the federated learning parameters related to the above services or applications.

Step 123: Based on the received request to terminate federated learning or leave the federated learning group, the NWDAF initiates a request to the UE or other NFs (such as AMF, SMF) to terminate federated learning or leave the federated learning group (other NFs are relative to NWDAF). For example:

a) NWDAF sends a request to terminate federated learning or leave the federated learning group to the corresponding UE based on the UE ID list or UE Group ID, which carries the federated learning Application ID, area, S-NSSAI, DNN, application features (Features) and other information, Instruct the UE to leave the federated learning group of the relevant service or application;

b) NWDAF sends a request to terminate federated learning or leave the federated learning group to AMF, which carries the federated learning UE ID list or UE Group ID, area, S-NSSAI, DNN and other information, instructing AMF to leave the relevant access management and/or Federated Learning Group for Mobility Management;

c) NWDAF sends a request to SMF to terminate federated learning or leave the federated learning group, which carries the Application ID, UE ID list or UE Group ID, area, S-NSSAI, DNN and other information corresponding to the federated learning PDU session, instructing SMF to leave the relevant Session-managed federated learning groups.

Step 124. The UE or NF that receives the request to terminate federated learning or leave the federated learning group sends a federated learning leaving request (FL leave request) to NWDAF, which carries the UE ID (UE ID) or NF ID (NF ID), requesting to leave. The FL group identifier.

Step 125. According to the received federated learning leaving request of the UE or NF, the NWDAF removes the UE or NF from the FL group; specifically, it can be: the information of the UE (such as UE ID) or the information of the NF (For example, NF ID) is deleted from the FL group context (FL group context) corresponding to the FL group identifier.

Step 126. The NWDAF sends a federated learning leave accept (FL leave accept) message, that is, a FL leaving response, to the UE or NF.

Step 127. Manage update operations;

(1) NF sends an NF information update request to NRF to delete the information of the FL group that NF left (such as FL group identification and FL group management function identification) from the NF profile.

(2) NRF feeds back the update response to NF.

Specifically, 1. Steps 11 to 112 are similar to steps 91-92 in FIG. 9. The difference is that the service or application-related federated learning parameters provided by the AF include: Application ID, UE ID list or UE that requires the termination of federated learning. Group ID, area, S-NSSAI, DNN, application features (Features) and other information.

2. Based on the received request to terminate federated learning or leave the federated learning group, NWDAF initiates a request to the UE or other NF (such as AMF, SMF) to terminate federated learning or leave the federated learning group. For example:

a) NWDAF sends a request to terminate federated learning or leave the federated learning group to the corresponding UE based on the UE ID list or UE Group ID, which carries the federated learning Application ID, area, S-NSSAI, DNN, application features (Features) and other information, Instruct the UE to leave the federated learning group of the relevant service or application;

b) NWDAF sends a request to terminate federated learning or leave the federated learning group to AMF, which carries the federated learning UE ID list or UE Group ID, area, S-NSSAI, DNN and other information, instructing AMF to leave the relevant access management and/or federated learning group for Mobility Management;

c) NWDAF sends a request to SMF to terminate federated learning or leave the federated learning group, which carries the Application ID, UE ID list or UE Group ID, area, S-NSSAI, DNN and other information corresponding to the federated learning PDU session, instructing SMF to leave the relevant Session-managed federated learning groups.

3. Regarding steps 124 to 127: The UE or other NF that receives the request to terminate federated learning or leave the federated learning group initiates the process of leaving the FL group (i.e., the federated learning group leaving process); similar to steps 61-64 in FIG. 6.

Figure 13:
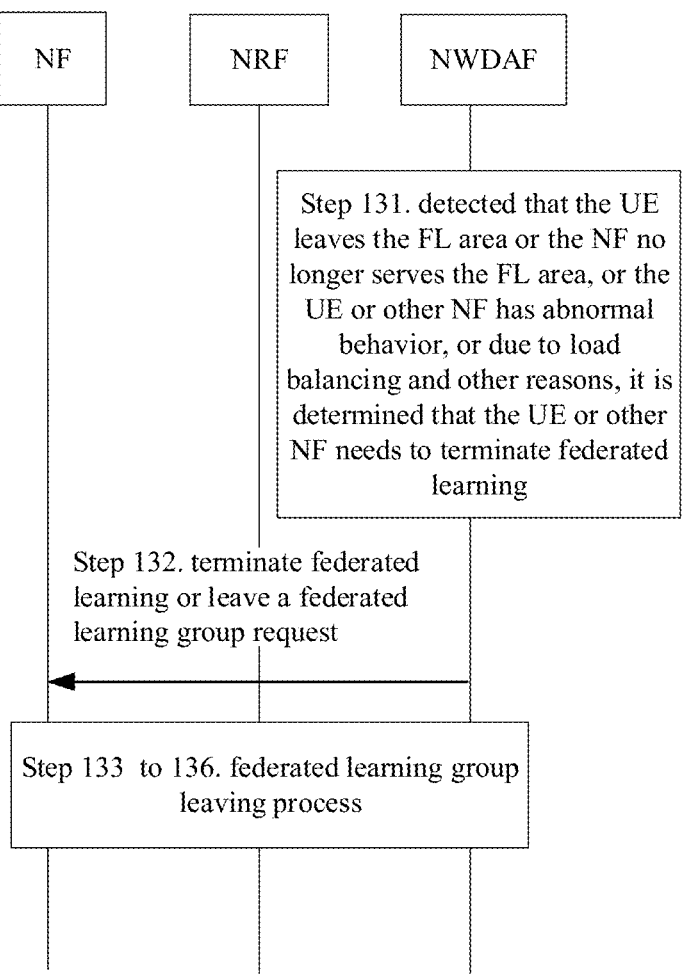
FIG. 13 is a schematic flowchart 9 of the specific implementation of the federated learning group processing method according to the embodiment of the present disclosure.
Figure 14:
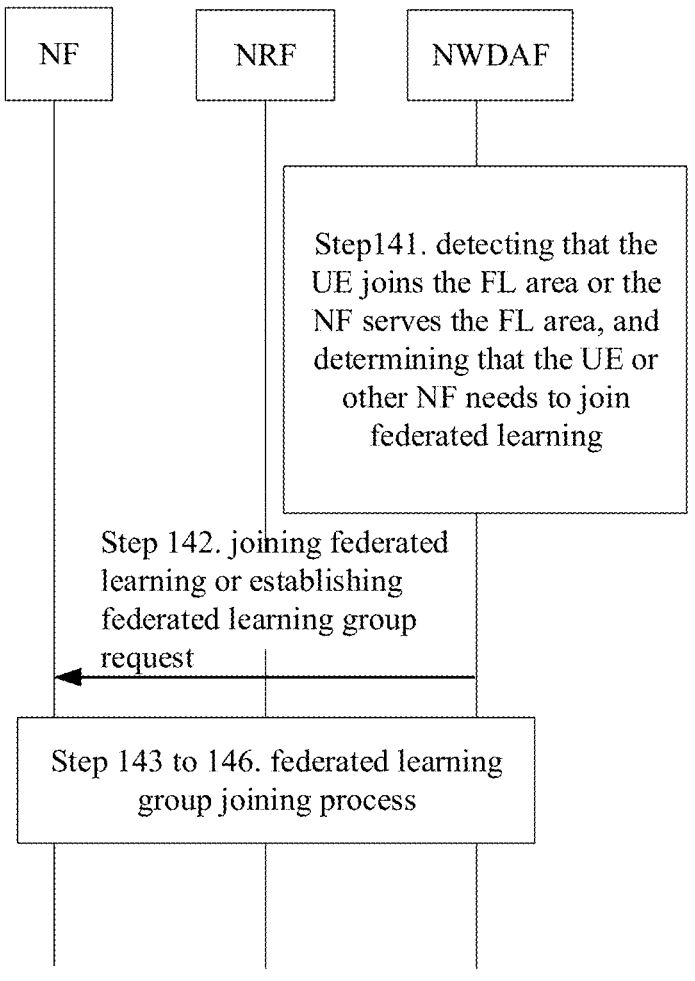
FIG. 14 is a schematic flowchart 10 of the specific implementation of the federated learning group processing method according to the embodiment of the present disclosure.

The fourth type, specifically, can be shown in FIG. 13. The method includes:

Step 131. The NWDAF determines to initiate a request to the UE or other NF (such as AMF, SMF) to terminate federated learning or leave the federated learning group based on external trigger conditions or local policies. For example NWDAF detects one of the following conditions:

1) The UE leaves the FL area, or the NF state changes, for example, the NF no longer serves the FL area;

UEs or other NFs with abnormal behavior (such as frequently establishing connections (corresponding to the frequency of establishing connections above being higher than the first threshold), the amount of transmitted data exceeding the threshold (corresponding to the amount of data being transmitted exceeding the second threshold));

3) NWDAF has a larger load for a specific FL.

That is, it is detected that the UE leaves the FL area or the NF no longer serves the FL area, or the UE or other NF has abnormal behavior, or due to load balancing and other reasons, it is determined that the UE or other NF needs to terminate federated learning.

Step 132. NWDAF sends a request to terminate federated learning or leave a federated learning group to relevant UEs or other NFs (such as AMF, SMF); including sending a request to terminate federated learning or leave a federated learning group to the following UEs or other NFs:

1) A UE that leaves the FL area, or a NF that no longer serves the FL area.

UE or other NF with abnormal behavior.

3) UEs or other NFs with lower priority in FL groups with larger loads.

Step 133. The UE or NF that receives the request to terminate federated learning or leave the federated learning group sends a federated learning leaving request (FL leave request) to NWDAF, which carries the UE ID (UE ID) or NF ID (NF ID), requesting to leave. The FL group identifier.

Step 134. According to the received federated learning leaving request of the UE or NF, the NWDAF removes the UE or NF from the FL group; specifically, it can be: the UE's information (such as UE ID) or the NF's information (For example, NF ID) is deleted from the FL group context (FL group context) corresponding to the FL group identifier.

Step 135. The NWDAF sends a federated learning leave accept (FL leave accept) message to the UE or NF, that is, a FL leaving response.

Step 136. Manage update operations;

(1) NF sends an NF information update request to NRF to delete the information of the FL group that NF left (such as FL group identification, FL group management function identification (here, NWDAF identification)) from the NF profile.

(2) NRF feeds back the update response to NF.

Specifically, regarding steps 133 to 136: the UE or other NF that receives the request to terminate federated learning or leave the federated learning group initiates the process of leaving the FL group (that is, the federated learning group leaving process); similar to steps 61-64 in FIG. 6.

It should be noted that in some of the drawings involved in the above examples, only NF is simply recorded for the UE or other NF, and the NF in the drawing actually corresponds to the above-mentioned UE or other NF.

From the above, the method provided by the embodiments of the present disclosure mainly involve:

1) The network function NF sends a federated learning join or leaving request to the federated learning management function (taking NWDAF as an example), which carries the NF identification (NF ID), the FL group identification requested to join or leave, or FL characteristic information, requesting to join or leave the corresponding FL group. The federated learning management function establishes and maintains federated learning group contexts.

2) AF provides service or application-related federated learning parameters, and PCF generates corresponding federated learning strategies based on these parameters. The network function NF joins or leaves the corresponding federated learning group according to the federated learning policies provided by PCF.

3) The federated learning management function (taking NWDAF as an example) requests a specific NF to join or leave the corresponding NF based on the service or application-related federated learning parameters provided by AF, or the federated learning policies provided by PCF, or other trigger conditions or local policies. Federated Learning Group.

In summary, the solution provided by the embodiments of the present disclosure can realize the dynamic management of the federated learning group in the mobile communication network (including the establishment or termination of the federated learning group (specifically, when the member joining the FL group is the first member, the FL group establishment; when the last member removes the FL group, it is the termination of the FL group), members join or leave, etc.), which can better meet the needs of network and service intelligence and improve the intelligent performance of communications and applications.

Figure 15:
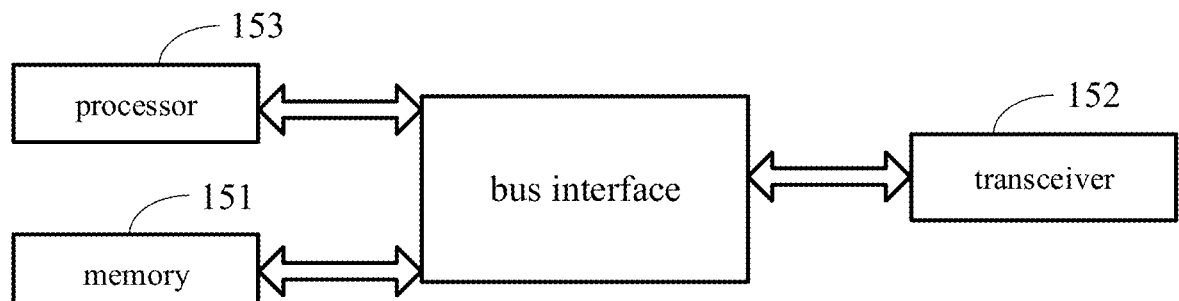
FIG. 15 is a schematic view 1 of a functional entity according to the embodiment of the present disclosure.

The embodiment of the present disclosure also provides a functional entity. The functional entity is a first functional entity. As shown in FIG. 15, the functional entity includes a memory 151, a transceiver 152, and a processor 153:

the memory 151 is configured to store computer programs; the transceiver 152 is configured to send and receive data under a control of the processor; the processor 153 is configured to read the computer programs in the memory to perform:

obtaining characteristic information of a federated learning (FL) group;

determining a second functional entity according to the characteristic information of the FL group; and adding the second functional entity to the FL group.

According to the embodiments of the present disclosure, the functional entity obtains characteristic information of a federated learning (FL) group, determines a second functional entity according to the characteristic information of the FL group, and joins the second functional entity to the FL group, thereby realizing dynamic processing of FL groups, so as to better meet the needs of network and service intelligence, and improve the intelligent performance of communications and applications.

Specifically, the transceiver 152 is configured to receive and send data under the control of the processor 153.

In FIG. 15, the bus architecture may include any number of interconnected buses and bridges, specifically one or more processors represented by processor 153 and various circuits of the memory represented by memory 151 are linked together. The bus architecture can also link together various other circuits such as peripherals, voltage regulators, and power management circuits, which are all well known in the art and therefore will not be described further herein. The bus interface provides the interface. The transceiver 152 may be a plurality of elements, including a transmitter and a receiver, providing a unit for communicating with various other devices over transmission media, including wireless channels, wired channels, optical cables, and other transmission media. The processor 153 is responsible for managing the bus architecture and general processing, and the memory 151 can store data used by the processor 153 when performing operations.

The processor 153 may be a central processing unit (CPU), an application specific integrated circuit (Application Specific Integrated Circuit, ASIC), a field programmable gate array (Field-Programmable Gate Array, FPGA) or a complex programmable logic device (Complex Programmable Logic Device), CPLD), the processor can also adopt a multi-core architecture.

Optionally, the obtaining the characteristic information of the FL group includes: receiving, by the transceiver, a first request sent by an application functional entity or a network exposure functional entity, and obtaining the characteristic information of the FL group according to application information or service information which is carried in the first request and related to the FL group; or, receiving, by the transceiver, a second request sent by a policy control functional entity, and obtaining the characteristic information of the FL group according to a control policy which is carried in the second request and related to the FL group.

Optionally, the characteristic information of the FL group includes first information, and/or identification information of functional entities allowed to join the FL group; the first information includes any one or more of the following: information of application or service corresponding to the FL group; area information corresponding to the FL group; network slice information corresponding to the FL group; data network information corresponding to the FL group.

Optionally, the determining the second functional entity according to the characteristic information of the FL group includes: determining the second functional entity that meets a first condition, according to the characteristic information of the FL group; where the first condition includes one or a combination of the following conditions: supporting the application or service corresponding to the FL group; serving the data network, network slice or area corresponding to the FL group; accessing the data network or network slice corresponding to the FL group; located in the area corresponding to the FL group; and the identification information being included in the identification information of the functional entities allowed to join the FL group.

Optionally, the adding the second functional entity to the FL group includes: sending, through a transceiver, a first FL joining request to the second functional entity, where the first FL joining request is configured to request the second functional entity to join the FL group, the first FL joining request carries information of the first functional information and the first information of the FL group; receiving, by a transceiver, a first FL joining response sent by the second functional entity.

Optionally, the determining the second functional entity according to the characteristic information of the FL group specifically includes: receiving, by the transceiver, a second FL joining request sent by the second functional entity, where the second FL joining request is configured to request to join the FL group, the second FL joining request carries the first information of the FL group and identification information of the second functional entity; determining the FL group to which the second functional entity is to join, according to the first information; determining whether the identification information of the second functional entity is included in the identification information of the functional entities allowed to join the FL group; if so, determining that the second functional entity is the second functional entity corresponding to the characteristic information of the FL group.

Optionally, the processor is further configured to: store second information of the FL group through the memory, where the second information includes one or more of the following: information of the first functional entity; information of the second functional entity; identification information of the FL group; information of application or service corresponding to the FL group; network slice information corresponding to the FL group; data network information corresponding to the FL group; and information of a machine learning (ML) model of the FL group.

Optionally, the information of the first functional entity includes one or more of: identification information, address information and location information of the first functional entity; or, the information of the second functional entity includes one or more of: identification information, address information and location information of the second functional entity.

Optionally, the processor is further configured to perform: determining whether the second functional entity meets conditions for leaving the FL group; if the second functional entity meets the conditions for leaving the FL group, removing the second functional entity from the FL group.

Optionally, the second functional entity meeting the conditions for leaving the FL group includes one or more of the following situations: the second functional entity no longer supports the application or service corresponding to the FL group; the second functional entity no longer serves the data network, the network slice or the area corresponding to the FL group; the second functional entity no longer accesses the data network or the network slice corresponding to the FL group; the second functional entity leaves the area corresponding to the FL group; the identification information of the second functional entity is no longer included in the identification information of the functional entities allowed to join the FL group; a first FL leaving request sent by the second functional entity is received, where the first FL leaving request is configured to request to leave the FL group; the second functional entity has an abnormal behavior, where the abnormal behavior includes: a frequency of establishing connections between the second functional entity and the first functional entity is higher than a first threshold, or an amount of data transmitted between the second functional entity and the first functional entity exceeds a second threshold.

Optionally, the determining whether the second functional entity meets conditions for leaving the FL group comprises: receiving, through the transceiver, updated characteristic information of the FL group sent by the third functional entity; according to the updated characteristic information of the FL group, determining whether the second functional entity meets the conditions for leaving the FL group.

Optionally, the removing the second functional entity from the FL group includes: sending, through the transceiver, a second FL leaving request to the second functional entity, where the second FL leaving request is configured to request the second functional entity to leave the FL group; receiving, through the transceiver, a second FL leaving response sent by the second functional entity.

Optionally, the removing the second functional entity from the FL group includes: removing information of the second functional entity from the second information of the FL group.

It should be noted here that the above-mentioned functional entity provided by the embodiment of the present disclosure can implement all the method steps implemented by the above-mentioned first functional entity-side method embodiment, and can achieve the same technical effect. This embodiment will no longer be discussed here. The same parts and beneficial effects as those in the method embodiments will be described in detail.

Figure 16:
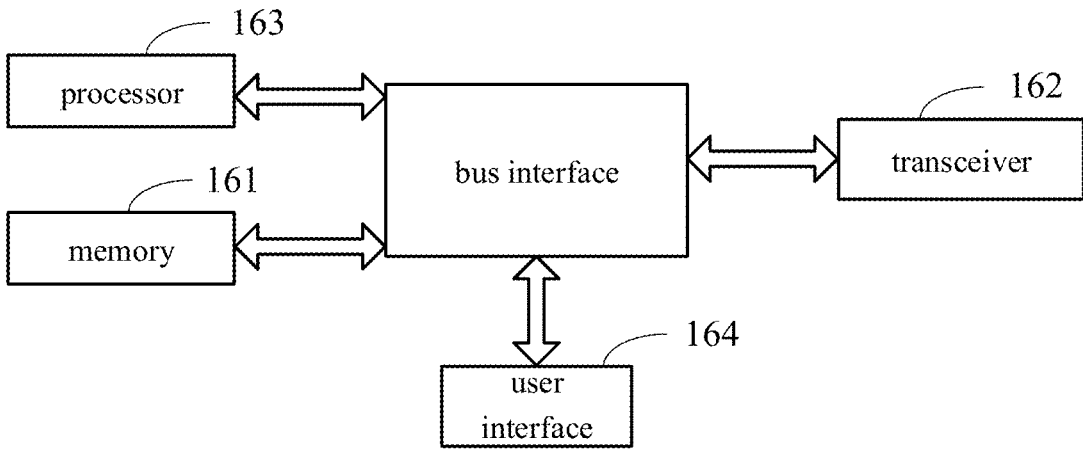
FIG. 16 is a schematic view 2 of a functional entity according to the embodiment of the present disclosure.
Figure 17:
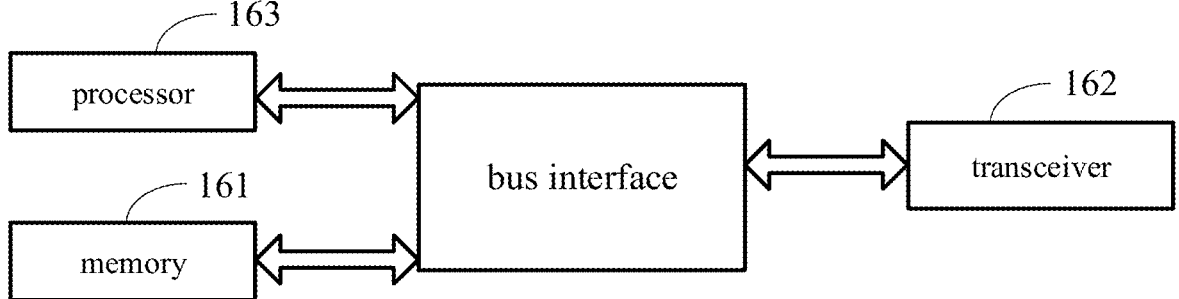
FIG. 17 is a schematic view 3 of a functional entity structure according to the embodiment of the present disclosure.

The embodiment of the present disclosure also provides a functional entity, which is a second functional entity. As shown in FIGS. 16 and 17, the functional entity includes a memory 161, a transceiver 162, and a processor 163:

the memory is configured to store computer programs; the transceiver is configured to send and receive data under a control of the processor; the processor is configured to read the computer programs in the memory to perform:

obtaining characteristic information of a federated learning (FL) group;

determine whether a condition for joining the FL group is met, based on the characteristic information of the FL group;

when the condition for joining the FL group is met, joining the FL group.

According to the embodiment of the present disclosure, the functional entity obtains the characteristic information of the federated learning (FL) group; determines whether the condition for joining the FL group is met according to the characteristic information of the FL group; and the conditions for joining the FL group is met, the FL group is added, thereby dynamic processing the FL group, better meeting the requirements for network and service intelligence, and improving the intelligent performance of communications and applications.

The second functional entity in the present disclosure can be implemented as a terminal (device), specifically as shown in FIG. 16, the transceiver 162 is configured to receive and send data under the control of the processor 163.

In FIG. 16, the bus architecture may include any number of interconnected buses and bridges, specifically one or more processors represented by processor 163 and various circuits of the memory represented by memory 161 are linked together. The bus architecture can also link together various other circuits such as peripherals, voltage regulators, and power management circuits, which are all well known in the art and therefore will not be described further herein. The bus interface provides the interface. Transceiver 162 may be a plurality of elements, including a transmitter and a receiver, providing a unit for communicating with various other devices over transmission media, including wireless channels, wired channels, optical cables, etc. Transmission medium. For different user devices, the user interface 164 may also be an interface capable of externally connecting internal and external required devices. The connected devices include but are not limited to keypads, monitors, speakers, microphones, joysticks, etc.

The processor 163 is responsible for managing the bus architecture and general processing, and the memory 161 can store data used by the processor 163 when performing operations.

Optionally, the processor 163 can be a CPU (central processor), ASIC (Application Specific Integrated Circuit), FPGA (Field-Programmable Gate Array, field programmable gate array) or CPLD (Complex Programmable Logic Device), complex programmable logic devices), the processor can also adopt a multi-core architecture.

Any of the methods provided by the embodiments of the present disclosure according to the obtained executable instructions by calling the computer program stored in the memory. The processor and memory can also be physically separated.

In addition, the second functional entity in the embodiment of the present disclosure can also be implemented as a network (side) device, specifically as shown in FIG. 17, the transceiver 162 is configured to receive and send data under the control of the processor 163.

In FIG. 17, the bus architecture may include any number of interconnected buses and bridges, specifically one or more processors represented by processor 163 and various circuits of the memory represented by memory 161 are linked together. The bus architecture can also link together various other circuits such as peripherals, voltage regulators, and power management circuits, which are all well known in the art and therefore will not be described further herein. The bus interface provides the interface. The transceiver 162 may be a plurality of elements, including a transmitter and a receiver, providing a unit for communicating with various other devices over transmission media, including wireless channels, wired channels, optical cables, and other transmission media. The processor 163 is responsible for managing the bus architecture and general processing, and the memory 161 can store data used by the processor 163 when performing operations.

The processor 163 may be a central processing unit (CPU), an Application Specific Integrated Circuit (ASIC), a Field-Programmable Gate Array (FPGA) or a complex programmable logic device (Complex Programmable Logic Device (CPLD), the processor can also adopt a multi-core architecture.

In the embodiment of the present disclosure, the obtaining the characteristic information of the FL group includes: receiving, by the transceiver, a third request sent by an application functional entity or a network exposure functional entity, and obtaining the characteristic information of the FL group according to application information or service information which is carried in the third request and related to the FL group;

or, receiving, by the transceiver, a fourth request sent by a policy control functional entity, and obtaining the characteristic information of the FL group according to a control policy which is carried in the fourth request and related to the FL group.

Optionally, the characteristic information of the FL group includes first information, and/or identification information of functional entities allowed to join the FL group; the first information includes any one or more of the following: information of application or service corresponding to the FL group; area information corresponding to the FL group; network slice information corresponding to the FL group; data network information corresponding to the FL group.

Optionally, the determine whether the condition for joining the FL group is met, based on the characteristic information of the FL group includes: determining the second functional entity that meets a second condition, according to the characteristic information of the FL group; where the second condition includes one or a combination of the following conditions: supporting the application or service corresponding to the FL group; serving the data network, network slice or area corresponding to the FL group; accessing the data network or network slice corresponding to the FL group; located in the area corresponding to the FL group; and the identification information being included in the identification information of the functional entities allowed to join the FL group.

Optionally, the processor is further configured to perform: prior to the joining the FL group, sending, through the transceiver, a first query request to the fourth functional entity, where the first query request carries third information of the FL group; receiving, through the transceiver, a first query response sent by the fourth functional entity, where the first query response carries information of at least one first functional entity that satisfies the third information; based on the information of the at least one first functional entity, determining from the at least one first functional entity, the first functional entity that is to establish the FL group with the second functional entity; where the third information of the FL group includes at least one of the following: information of application or service corresponding to the FL group; network slice information corresponding to the FL group; data network information corresponding to the FL group; information of a machine learning (ML) model of the FL group.

Optionally, the information of the first functional entity includes at least one of: address information, location information and service area information of the first functional entity; where based on the information of the at least one first functional entity, determining from the at least one first functional entity, the first functional entity that is to establish the FL group with the second functional entity includes: based on the information of the at least one first functional entity, selecting the first functional entity that satisfies a third condition from the at least one first functional entity as the first functional entity to establish the FL group with the second functional entity; where the third condition includes at least one of the following: belonging to a same local network as the second functional entity; serving an area where the second functional entity is located; and having a shortest distance to the second functional entity among at least one first functional entity.

Optionally, the joining the FL group includes: sending, through the transceiver, a second FL joining request to the first functional entity, where the second FL joining request is configured to request to join the FL group, the second FL joining request carries information of the first functional information and the first information of the FL group; receiving, through the transceiver, a second FL joining response sent by the first functional entity.

Optionally, the processor is further configured to perform: storing second information of the FL group, where the second information includes one or more of the following: information of the first functional entity; information of the second functional entity; identification information of the FL group; information of application or service corresponding to the FL group; network slice information corresponding to the FL group; data network information corresponding to the FL group; and information of a machine learning (ML) model of the FL group.

Optionally, the information of the first functional entity includes one or more of: identification information, address information and location information of the first functional entity; or, the information of the second functional entity includes one or more of: identification information, address information and location information of the second functional entity.

Optionally, subsequent to joining the FL group, the processor is further configured to: determining whether the second functional entity meets conditions for leaving the FL group; when the second functional entity meets the conditions for leaving the FL group, leaving the FL group, wherein the leaving the FL group comprises: sending a first FL leaving request to the first functional entity, where the first FL leaving request is configured to request to leave the FL group.

Optionally, the second functional entity meeting the conditions for leaving the FL group includes one or more of the following situations: the second functional entity no longer supports the application or service corresponding to the FL group; the second functional entity no longer serves the data network, the network slice or the area corresponding to the FL group; the second functional entity no longer accesses the data network or the network slice corresponding to the FL group; and the second functional entity leaves the area corresponding to the FL group.

Optionally, the determining whether the second functional entity meets the conditions for leaving the FL group includes: receiving, through the transceiver, updated characteristic information of the FL group sent by the third functional entity; according to the updated characteristic information of the FL group, determining whether the second functional entity meets the conditions for leaving the FL group.

Optionally, the leaving the FL group further comprises: deleting second information of the FL group stored in the second functional entity.

It should be noted here that the above-mentioned functional entity provided by the embodiment of the present disclosure can implement all the method steps implemented by the above-mentioned second functional entity-side method embodiment, and can achieve the same technical effect. This embodiment will no longer be discussed here. The same parts and beneficial effects as those in the method embodiments will be described in detail.

Figure 18:
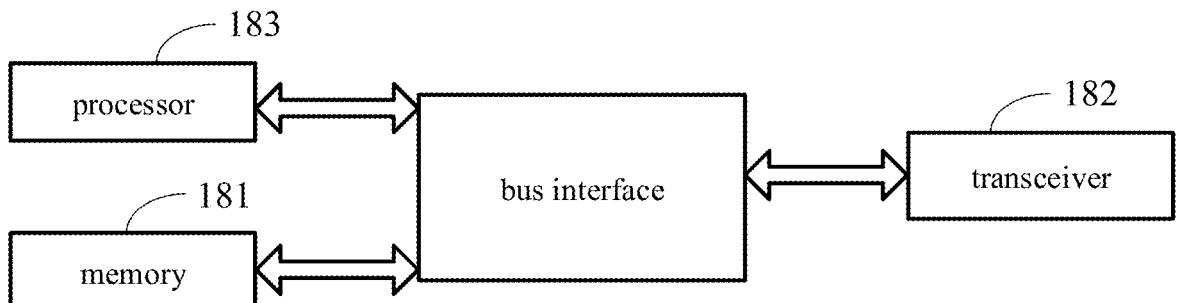
FIG. 18 is a schematic view 4 of a functional entity structure according to the embodiment of the present disclosure.

Embodiment of the present disclosure also provides a functional entity, which is a third functional entity. As shown in FIG. 18, the functional entity includes a memory 181, a transceiver 182, and a processor 183:

the memory is configured to store computer programs; the transceiver is configured to send and receive data under a control of the processor; the processor is configured to read the computer programs in the memory to perform:

sending, through the transceiver 182, a first request or a second request to a first functional entity;

where the first request carries application information or service information related to a federated learning (FL) group, and the second request carries a control policy related to the FL group, to enable the first functional entity to establish or update the FL group according to the application information, the service information or the control policy related to the FL group.

According to the embodiment of the present disclosure, the functional entity sends a first request or a second request to the first functional entity; where the first request carries application information or service information related to the federated learning (FL) group, and the second request carries the control policy related to the federated learning (FL) group; so that the first functional entity can create or update the FL group according to control policy, apply information, service information or control policies of the FL group, thereby dynamic processing the FL group, better meeting the needs of network and service intelligence, and improving the intelligent performance of communications and applications.

Specifically, the transceiver 182 is configured to receive and send data under the control of the processor 183.

In FIG. 18, the bus architecture may include any number of interconnected buses and bridges, specifically one or more processors represented by processor 183 and various circuits of the memory represented by memory 181 are linked together. The bus architecture can also link together various other circuits such as peripherals, voltage regulators, and power management circuits, which are all well known in the art and therefore will not be described further herein. The bus interface provides the interface. The transceiver 182 may be a plurality of elements, including a transmitter and a receiver, providing a unit for communicating with various other devices over transmission media, including wireless channels, wired channels, optical cables, and other transmission media. The processor 183 is responsible for managing the bus architecture and general processing, and the memory 181 can store data used by the processor 183 when performing operations.

The processor 183 may be a central processing unit (CPU), an application specific integrated circuit (Application Specific Integrated Circuit, ASIC), a field programmable gate array (Field-Programmable Gate Array, FPGA) or a complex programmable logic device (Complex Programmable Logic Device), CPLD), the processor can also adopt a multi-core architecture.

Optionally, the application information, the service information or the control policy related to the FL group includes: the characteristic information of the FL group. Optionally, the characteristic information of the FL group includes first information, and/or identification information of functional entities allowed to join the FL group; the first information includes any one or more of the following: information of application or service corresponding to the FL group; area information corresponding to the FL group; network slice information corresponding to the FL group; data network information corresponding to the FL group.

It should be noted here that the above-mentioned functional entity provided by the embodiment of the present disclosure can implement all the method steps implemented by the above-mentioned third functional entity-side method embodiment, and can achieve the same technical effect. This embodiment will no longer be discussed here. The same parts and beneficial effects as those in the method embodiments will be described in detail.

Figure 19:
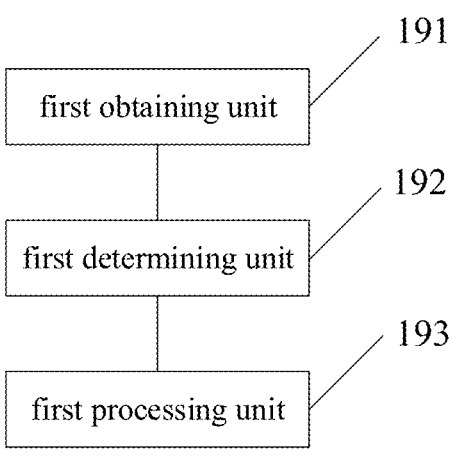
FIG. 19 is a schematic view 1 of a federated learning group processing device according to the embodiment of the present disclosure.

The embodiment of the present disclosure also provides a federated learning group processing device, which is applied to the first functional entity. As shown in FIG. 19, the device includes:

a first obtaining unit 191, configured to obtain characteristic information of a federated learning (FL) group;

a first determining unit 192, configured to determine a second functional entity according to the characteristic information of the FL group; and a first processing unit 193, configured to join the second functional entity to the FL group.

The federated learning group processing device provided by the embodiment of the present disclosure obtains the characteristic information of the federated learning (FL) group; determines the second functional entity according to the characteristic information of the FL group; and joins the second functional entity to the FL group, thereby realizing dynamic processing of FL groups, better meeting the needs of network and service intelligence, and improving the intelligent performance of communications and applications.

Optionally, the obtaining the characteristic information of the FL group includes: receiving a first request sent by an application functional entity or a network exposure functional entity, and obtaining the characteristic information of the FL group according to application information or service information which is carried in the first request and related to the FL group; or, receiving a second request sent by a policy control functional entity, and obtaining the characteristic information of the FL group according to a control policy which is carried in the second request and related to the FL group.

Optionally, the characteristic information of the FL group includes first information, and/or identification information of functional entities allowed to join the FL group; the first information includes any one or more of the following: information of application or service corresponding to the FL group; area information corresponding to the FL group; network slice information corresponding to the FL group; data network information corresponding to the FL group.

Optionally, the determining the second functional entity according to the characteristic information of the FL group includes: determining the second functional entity that meets a first condition, according to the characteristic information of the FL group; where the first condition includes one or a combination of the following conditions: supporting the application or service corresponding to the FL group; serving the data network, network slice or area corresponding to the FL group; accessing the data network or network slice corresponding to the FL group; located in the area corresponding to the FL group; and the identification information being included in the identification information of the functional entities allowed to join the FL group.

Optionally, the adding the second functional entity to the FL group includes: sending a first FL joining request to the second functional entity, where the first FL joining request is configured to request the second functional entity to join the FL group, the first FL joining request carries information of the first functional information and the first information of the FL group; receiving a first FL joining response sent by the second functional entity.

Optionally, the determining the second functional entity according to the characteristic information of the FL group specifically includes: receiving a second FL joining request sent by the second functional entity, where the second FL joining request is configured to request to join the FL group, the second FL joining request carries the first information of the FL group and identification information of the second functional entity; determining the FL group to which the second functional entity is to join, according to the first information; determining whether the identification information of the second functional entity is included in the identification information of the functional entities allowed to join the FL group; if so, determining that the second functional entity is the second functional entity corresponding to the characteristic information of the FL group.

Optionally, device further includes: a first storing unit, configured to store second information of the FL group, where the second information includes one or more of the following: information of the first functional entity; information of the second functional entity; identification information of the FL group; information of application or service corresponding to the FL group; network slice information corresponding to the FL group; data network information corresponding to the FL group; and information of a machine learning (ML) model of the FL group.

Optionally, the information of the first functional entity includes one or more of: identification information, address information and location information of the first functional entity; or, the information of the second functional entity includes one or more of: identification information, address information and location information of the second functional entity.

Optionally, the device further includes: a second determining unit, configured to, after the second functional entity is joined to the FL group, determine whether the second functional entity meets conditions for leaving the FL group; a second processing unit, configured to, if the second functional entity meets the conditions for leaving the FL group, remove the second functional entity from the FL group.

Optionally, the second functional entity meeting the conditions for leaving the FL group includes one or more of the following situations: the second functional entity no longer supports the application or service corresponding to the FL group; the second functional entity no longer serves the data network, the network slice or the area corresponding to the FL group; the second functional entity no longer accesses the data network or the network slice corresponding to the FL group; the second functional entity leaves the area corresponding to the FL group; the identification information of the second functional entity is no longer included in the identification information of the functional entities allowed to join the FL group; a first FL leaving request sent by the second functional entity is received, where the first FL leaving request is configured to request to leave the FL group; the second functional entity has an abnormal behavior, where the abnormal behavior includes: a frequency of establishing connections between the second functional entity and the first functional entity is higher than a first threshold, or an amount of data transmitted between the second functional entity and the first functional entity exceeds a second threshold.

Optionally, the determining whether the second functional entity meets conditions for leaving the FL group includes: receiving updated characteristic information of the FL group sent by the third functional entity; the determining whether the second functional entity meets the conditions for leaving the FL group includes: according to the updated characteristic information of the FL group, determining whether the second functional entity meets the conditions for leaving the FL group.

Optionally, the removing the second functional entity from the FL group includes: sending a second FL leaving request to the second functional entity, where the second FL leaving request is configured to request the second functional entity to leave the FL group; receiving a second FL leaving response sent by the second functional entity.

Optionally, the removing the second functional entity from the FL group includes: removing information of the second functional entity from the second information of the FL group.

It should be noted here that the above-mentioned device provided by the embodiment of the present disclosure can implement all the method steps implemented by the above-mentioned first functional entity-side method embodiment, and can achieve the same technical effect. No further explanation will be given here. The same parts and beneficial effects as those in the method embodiment will be described in detail.

Figure 20:
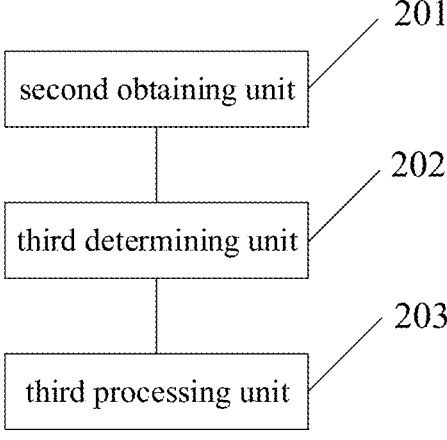
FIG. 20 is a schematic view 2 of a federated learning group processing device according to the embodiment of the present disclosure.

The embodiment of the present disclosure also provides a federated learning group processing device, which is applied to the second functional entity. As shown in FIG. 20, the device includes:

a second obtaining unit 201, configured to obtain characteristic information of a federated learning (FL) group;

a third determining unit 202, configured to determine whether a condition for joining the FL group is met, based on the characteristic information of the FL group; and a third processing unit 203, configured to, when the condition for joining the FL group is met, join the FL group.

The federated learning group processing device provided by the embodiment of the present disclosure obtains the characteristic information of the federated learning (FL) group; determines whether the condition for joining the FL group is met based on the characteristic information of the FL group; and after the condition for joining the FL group is met, joins the FL group, thereby realizing dynamic processing of the FL group, better meeting the needs of network and service intelligence, and improving the intelligent performance of communications and applications.

Optionally, the obtaining the characteristic information of the FL group includes: receiving a third request sent by an application functional entity or a network exposure functional entity, and obtaining the characteristic information of the FL group according to application information or service information which is carried in the third request and related to the FL group; or, receiving a fourth request sent by a policy control functional entity, and obtaining the characteristic information of the FL group according to a control policy which is carried in the fourth request and related to the FL group.

Optionally, the characteristic information of the FL group includes first information, and/or identification information of functional entities allowed to join the FL group; the first information includes any one or more of the following: information of application or service corresponding to the FL group; area information corresponding to the FL group; network slice information corresponding to the FL group; data network information corresponding to the FL group.

Optionally, the determining the second functional entity according to the characteristic information of the FL group includes: determining the second functional entity that meets a second condition, according to the characteristic information of the FL group; where the second condition includes one or a combination of the following conditions: supporting the application or service corresponding to the FL group; serving the data network, network slice or area corresponding to the FL group; accessing the data network or network slice corresponding to the FL group; located in the area corresponding to the FL group; and the identification information being included in the identification information of the functional entities allowed to join the FL group Optionally, the device further includes: a first sending unit, configured to, before adding to the FL group, send a first query request to the fourth functional entity, where the first query request carries third information of the FL group; a first receiving unit, configured to receive a first query response sent by the fourth functional entity, where the first query response carries information of at least one first functional entity that satisfies the third information; a first determining unit, configured to, based on the information of the at least one first functional entity, determine from the at least one first functional entity, the first functional entity that is to establish the FL group with the second functional entity; where the third information of the FL group includes at least one of the following: information of application or service corresponding to the FL group; network slice information corresponding to the FL group; data network information corresponding to the FL group; information of a machine learning (ML) model of the FL group.

Optionally, the information of the first functional entity includes at least one of: address information, location information and service area information of the first functional entity; where based on the information of the at least one first functional entity, determining from the at least one first functional entity, the first functional entity that is to establish the FL group with the second functional entity includes: based on the information of the at least one first functional entity, selecting the first functional entity that satisfies a third condition from the at least one first functional entity as the first functional entity to establish the FL group with the second functional entity; where the third condition includes at least one of the following: belonging to a same local network as the second functional entity; serving an area where the second functional entity is located; and having a shortest distance to the second functional entity among the at least one first functional entity.

Optionally, the adding the FL group includes: sending a second FL joining request to a first functional entity, where the second FL joining request is configured to request to join the FL group, the second FL joining request carries information of the first functional information and the first information of the FL group; receiving a second FL joining response sent by the first functional entity.

Optionally, the method further comprises: storing second information of the FL group, where the second information includes one or more of the following: information of the first functional entity; information of the second functional entity; identification information of the FL group; information of application or service corresponding to the FL group; network slice information corresponding to the FL group; data network information corresponding to the FL group; and information of a machine learning (ML) model of the FL group.

Optionally, the information of the first functional entity includes one or more of: identification information, address information and location information of the first functional entity; or, the information of the second functional entity includes one or more of: identification information, address information and location information of the second functional entity.

Optionally, the device further includes: a fifth determining unit, configured to, after joining the FL group, determine whether the second functional entity meets conditions for leaving the FL group; a fourth processing unit, configured to, when the second functional entity meets the conditions for leaving the FL group, leave the FL group; where the leaving the FL group comprises: sending a first FL leaving request to the first functional entity, where the first FL leaving request is configured to request to leave the FL group.

Optionally, the second functional entity meeting the conditions for leaving the FL group includes one or more of the following situations: the second functional entity no longer supports the application or service corresponding to the FL group; the second functional entity no longer serves the data network, the network slice or the area corresponding to the FL group; the second functional entity no longer accesses the data network or the network slice corresponding to the FL group; and the second functional entity leaves the area corresponding to the FL group.

Optionally, the determining whether the second functional entity meets the conditions for leaving the FL group includes: receiving updated characteristic information of the FL group sent by the third functional entity; according to the updated characteristic information of the FL group, determining whether the second functional entity meets the conditions for leaving the FL group;

Optionally, the leaving the FL group further comprises: deleting second information of the FL group stored in the second functional entity.

It should be noted here that the above-mentioned device provided by the embodiment of the present disclosure can implement all the method steps implemented by the above-mentioned second functional entity-side method embodiment, and can achieve the same technical effect. No further explanation will be given here. The same parts and beneficial effects as those in the method embodiment will be described in detail.

Figure 21:
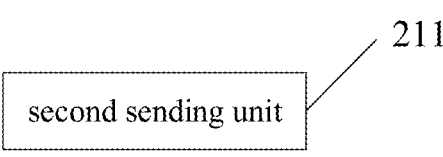
FIG. 21 is a schematic view 3 of a federated learning group processing device according to the embodiment of the present disclosure.

The embodiment of the present disclosure also provides a federated learning group processing device, which is applied to the third functional entity. As shown in FIG. 21, the device includes:

a second sending unit 211, configured to send a first request or a second request to a first functional entity;
  where the first request carries application information or service information related to a federated learning (FL) group, and the second request carries a control policy related to the FL group, to enable the first functional entity to establish or update the FL group according to the application information, the service information or the control policy related to the FL group.

The federated learning group processing device provided by the embodiment of the present disclosure sends a first request or a second request to the first functional entity; where the first request carries application information or service information related to the federated learning (FL) group, and the second request carries the control policy related to the federated learning (FL) group; so that the first functional entity may create or update the FL group according to control policy, apply information, service information or control policies of the FL group, thereby dynamic processing the FL group can be realized, thereby better meeting the needs of network and service intelligence, and improving the intelligent performance of communications and applications.

Optionally, the application information, the service information or the control policy related to the FL group includes: the characteristic information of the FL group. Optionally, the characteristic information of the FL group includes first information, and/or identification information of functional entities allowed to join the FL group; the first information includes any one or more of the following: information of application or service corresponding to the FL group; area information corresponding to the FL group; network slice information corresponding to the FL group; data network information corresponding to the FL group.

It should be noted here that the above-mentioned device provided by the embodiment of the present disclosure can implement all the method steps implemented by the above-mentioned third functional entity-side method embodiment, and can achieve the same technical effect. No further explanation will be given here. The same parts and beneficial effects as those in the method embodiment will be described in detail.

It should be noted that the division of units in the embodiments of the present disclosure is schematic and is only a logical function division. In actual implementation, there may be other division methods. In addition, each functional unit in various embodiments of the present disclosure may be integrated into one processing unit, or each unit may exist physically alone, or two or more units may be integrated into one unit. The above integrated units can be implemented in the form of hardware or software functional units.

If the integrated unit is implemented in the form of a software functional unit and sold or used as an independent product, it may be stored in a processor-readable storage medium. Based on this understanding, the technical solution of the present disclosure is essentially or contributes to the relevant technology, or all or part of the technical solution can be embodied in the form of a software product, and the computer software product is stored in a storage medium, It includes several instructions to cause a computer device (which can be a personal computer, a server, or a network device, etc.) or a processor to execute all or part of the steps of the methods described in various embodiments of the present disclosure. The aforementioned storage media include: U disk, mobile hard disk, read-only memory (ROM), random access memory (RAM), magnetic disk or optical disk and other media that can store program code.

Embodiments of the present disclosure also provide a processor-readable storage medium. The processor-readable storage medium stores a computer program. The computer program is configured to cause the processor to perform the federated learning on the first functional entity side. Group processing method; or, the computer program is configured to cause the processor to execute the federated learning group processing method on the second functional entity side; or, the computer program is configured to cause the processor to execute the third functional entity Side federated learning group processing method.

The processor-readable storage medium may be any available media or data storage device that the processor can access, including but not limited to magnetic storage (such as floppy disks, hard disks, magnetic tapes, magneto-optical disks (magneto-optical, MO), etc.), Optical storage (such as Compact Disk (CD), Digital Versatile Disc (DVD), Blu-ray Disc (BD), High-Definition Versatile Disc (HVD), etc.), and semiconductor memories (such as ROM, Erasable Programmable Read-Only Memory (EPROM), Electrically Erasable Programmable Read-Only Memory (EEPROM), non-volatile memory (NAND FLASH), solid state drive (Solid State Disk (SSD)), etc.

The implementation embodiments of the federated learning group processing method on the first functional entity side, the second functional entity side or the third functional entity side are all applicable to the embodiment of the processor-readable storage medium, and can also achieve Same technical effect.

Those skilled in the art will appreciate that embodiments of the present disclosure may be provided as methods, systems, or computer program products. Accordingly, the present disclosure may take the form of an entirely hardware embodiment, an entirely software embodiment, or an embodiment that combines software and hardware aspects. Furthermore, the present disclosure may take the form of a computer program product embodied on one or more computer-usable storage media (including, but not limited to, magnetic disk storage, optical storage, and the like) having computer-usable program code embodied therein.

The present disclosure is described with reference to flowchart illustrations and/or block diagrams of methods, apparatus (systems), and computer program products according to embodiments of the disclosure. It will be understood that each process and/or block in the flowchart illustrations and/or block diagrams, and combinations of processes and/or blocks in the flowchart illustrations and/or block diagrams, can be implemented by computer-executable instructions. These computer-executable instructions may be provided to a processor of a general-purpose computer, special-purpose computer, embedded processor, or other programmable data processing device to produce a machine such that the instructions executed by the processor of the computer or other programmable data processing device produce Means for implementing the functions specified in a process or processes in a flowchart and/or in a block or blocks in a block diagram.

These processor-executable instructions may also be stored in a processor-readable memory that causes a computer or other programmable data processing apparatus to operate in a particular manner, such that the generation of instructions stored in the processor-readable memory includes the manufacture of the instruction means product, the instruction device implements the function specified in one process or multiple processes in the flow chart and/or one block or multiple blocks in the block diagram.

These processor-executable instructions may also be loaded onto a computer or other programmable data processing device, causing a series of operational steps to be performed on the computer or other programmable device to produce computer-implemented processing, thereby causing the computer or other programmable device to The instructions that are executed provide steps for implementing the functions specified in a process or processes of the flowchart diagrams and/or a block or blocks of the block diagrams.

It should be noted that it should be understood that the division of each module above is only a division of logical functions. In actual implementation, it can be fully or partially integrated into a physical entity, or it can also be physically separated. These modules can all be implemented in the form of software calling through processing components; they can also all be implemented in the form of hardware; some modules can also be implemented in the form of software calling through processing components, and some modules can be implemented in the form of hardware. For example, the determination module can be a separate processing element, or can be integrated into a chip of the above device. In addition, it can also be stored in the memory of the above device in the form of program code, and can be processed by a certain processing element of the above device. Call and execute the functions of the above identified modules. The implementation of other modules is similar. In addition, all or part of these modules can be integrated together or implemented independently. The processing element described here may be an integrated circuit with signal processing capabilities. During the implementation process, each step of the above method or each of the above modules can be completed by instructions in the form of hardware integrated logic circuits or software in the processor element.

For example, each module, unit, sub-unit or sub-module may be one or more integrated circuits configured to implement the above method, such as: one or more Application Specific Integrated Circuits (ASICs), or one or Multiple microprocessors (digital signal processor, DSP), or one or more field programmable gate arrays (Field Programmable Gate Array, FPGA), etc. For another example, when one of the above modules is implemented in the form of a processing element scheduler code, the processing element can be a general-purpose processor, such as a central processing unit (Central Processing Unit, CPU) or other processors that can call the program code. For another example, these modules can be integrated together and implemented in the form of a system-on-a-chip (SOC).

The terms "first", "second" in the present disclosure are configured to distinguish similar objects and are not necessarily configured to describe a specific order or sequence. It is to be understood that the data so used are interchangeable under appropriate circumstances so that the embodiments of the disclosure described herein may be implemented, for example, in sequences other than those illustrated or described herein. Furthermore, the terms "include" and "having" and any variations thereof are intended to cover non-exclusive inclusions, e.g., a process, method, system, product, or apparatus that encompasses a series of steps or units and need not be limited to those explicitly listed. Those steps or elements may instead include other steps or elements not expressly listed or inherent to the process, method, product or apparatus. In addition, the use of "and/or" in the description and claims indicates at least one of the connected objects, such as A and/or B and/or C, indicating the inclusion of A alone, B alone, C alone, and both A and B. There are 7 situations in which both B and C exist, both A and C exist, and A, B, and C all exist. Similarly, the use of "at least one of A and B" in this specification and in the claims should be understood to mean "A alone, B alone, or both A and B present."

Obviously, those skilled in the art can make various changes and modifications to the present disclosure without departing from the spirit and scope of the disclosure. In this way, if these modifications and variations of the present disclosure fall within the scope of the claims of the present disclosure and equivalent technologies, the present disclosure is also intended to include these modifications and variations.

What is claimed is:

1. A federated learning group processing method, applied to a first functional entity and comprising:
   determining characteristic information of a federated learning (FL) group;
   determining a second functional entity according to the characteristic information of the FL group; and
   adding the second functional entity to the FL group;

wherein the method further comprises:

determining whether the second functional entity meets conditions for leaving the FL group;

if the second functional entity meets the conditions for leaving the FL group, removing the second functional entity from the FL group.

2. The federated learning group processing method according to claim 1, wherein the determining the characteristic information of the FL group comprises:

receiving a first request sent by an application functional entity or a network exposure functional entity, and determining the characteristic information of the FL group according to application information or service information which is carried in the first request and related to the FL group;

or, receiving a second request sent by a policy control functional entity, and determining the characteristic information of the FL group according to a control policy which is carried in the second request and related to the FL group.

3. The federated learning group processing method according to claim 1, wherein the characteristic information of the FL group comprises first information, and/or identification information of functional entities allowed to join the FL group;

the first information comprises any one or more of the following:

information of an application or a service corresponding to the FL group;

area information corresponding to the FL group;

network slice information corresponding to the FL group;

data network information corresponding to the FL group.

4. The federated learning group processing method according to claim 3, wherein the determining the second functional entity according to the characteristic information of the FL group comprises:

determining the second functional entity that meets a first condition, according to the characteristic information of the FL group;

wherein the first condition comprises one or a combination of the following conditions:

supporting the application or service corresponding to the FL group;

serving the data network, network slice or area corresponding to the FL group;

accessing the data network or network slice corresponding to the FL group;

located in the area corresponding to the FL group; and the identification information being comprised in the identification information of the functional entities allowed to join the FL group.

5. The federated learning group processing method according to claim 3, wherein the adding the second functional entity to the FL group comprises:

sending an FL request to the second functional entity, wherein the FL request is configured to request the second functional entity to join the FL group, the FL request carries information of the first functional information and the first information of the FL group;

receiving a first FL response of joining the FL group sent by the second functional entity.

6. The federated learning group processing method according to claim 3, wherein the determining the second functional entity according to the characteristic information of the FL group specifically comprises:

receiving an FL request sent by the second functional entity, wherein the FL request is configured to request to join the FL group, the FL request carries the first information of the FL group and identification information of the second functional entity;

determining the FL group to which the second functional entity is to join, according to the first information;

determining whether the identification information of the second functional entity is comprised in the identification information of the functional entities allowed to join the FL group;

if so, determining that the second functional entity is the second functional entity corresponding to the characteristic information of the FL group.

7. The federated learning group processing method according to claim 1, further comprising:

storing information of the FL group, wherein the information comprises one or more of the following:

information of the first functional entity;

information of the second functional entity;

identification information of the FL group;

information of an application or a service corresponding to the FL group;

network slice information corresponding to the FL group;

data network information corresponding to the FL group; and information of a machine learning (ML) model of the FL group.

8. The federated learning group processing method according to claim 7, wherein the removing the second functional entity from the FL group comprises:

sending an FL request to the second functional entity, wherein the FL request is configured to request the second functional entity to leave the FL group;

receiving a FL response of leaving the FL group sent by the second functional entity;

or the removing the second functional entity from the FL group comprises:

removing information of the second functional entity from the information of the FL group.

9. The federated learning group processing method according to claim 1, further comprising:

receiving updated characteristic information of the FL group sent by a third functional entity;

the determining whether the second functional entity meets the conditions for leaving the FL group comprises:

according to the updated characteristic information of the FL group, determining whether the second functional entity meets the conditions for leaving the FL group.

10. The federated learning group processing method according to claim 1, wherein the second functional entity meeting the conditions for leaving the FL group comprises one or more of the following situations:

the second functional entity no longer supports the application or service corresponding to the FL group;

the second functional entity no longer serves the data network, the network slice or the area corresponding to the FL group;

the second functional entity no longer accesses the data network or the network slice corresponding to the FL group;

the second functional entity leaves the area corresponding to the FL group;

the identification information of the second functional entity is no longer comprised in the identification information of the functional entities allowed to join the FL group;

an FL request sent by the second functional entity is received, wherein the FL request is configured to request to leave the FL group;

the second functional entity has an abnormal behavior, wherein the abnormal behavior comprises: a frequency of establishing connections between the second functional entity and the first functional entity is higher than a first threshold, or an amount of data transmitted between the second functional entity and the first functional entity exceeds a second threshold.

11. A functional entity, wherein the functional entity is a first functional entity and comprising a memory, a transceiver and a processor; wherein the memory is configured to store computer programs; the transceiver is configured to send and receive data under a control of the processor; the processor is configured to read the computer programs in the memory to perform the federated learning group processing method according to claim 1.

12. A federated learning group processing method, wherein a federated learning (FL) group comprises a first functional entity, and the method is applied to a second functional entity and comprises:

obtaining characteristic information of the FL group;

determining whether a condition for joining the FL group is met, based on the characteristic information of the FL group;

when the condition for joining the FL group is met, joining the FL group;

wherein the method further comprises:

determining whether the second functional entity meets conditions for leaving the FL group;

when the second functional entity meets the conditions for leaving the FL group, sending an FL request to the first functional entity, wherein the FL request is configured to request to leave the FL group.

13. The federated learning group processing method according to claim 12, wherein the obtaining the characteristic information of the FL group comprises:

receiving a first request sent by an application functional entity or a network exposure functional entity, and obtaining the characteristic information of the FL group according to application information or service information which is carried in the fifth-first request and related to the FL group;

or, receiving a second request sent by a policy control functional entity, and obtaining the characteristic information of the FL group according to a control policy which is carried in the second request and related to the FL group.

14. The federated learning group processing method according to claim 12, wherein prior to the joining the FL group, the method further comprises:

sending a first query request to a third functional entity, wherein the first query request carries information of the FL group;

receiving a first query response sent by the third functional entity, wherein the first query response carries information of at least one first functional entity that satisfies the information of the FL group;

based on the information of the at least one first functional entity, determining the first functional entity that is to establish the FL group with the second functional entity;

wherein the information of the FL group comprises at least one of the following:

information of an application or a service corresponding to the FL group;

network slice information corresponding to the FL group;

data network information corresponding to the FL group;

information of a machine learning (ML) model of the FL group.

15. The federated learning group processing method according to claim 14, wherein based on the information of the at least one first functional entity, determining the first functional entity that is to establish the FL group with the second functional entity comprises:

based on the information of the at least one first functional entity, selecting the first functional entity that satisfies a condition from the at least one first functional entity as the first functional entity to establish the FL group with the second functional entity;

wherein the condition comprises at least one of the following:

belonging to a same local network as the second functional entity;

serving an area where the second functional entity is located; and having a shortest distance to the second functional entity among the at least one first functional entity.

16. The federated learning group processing method according to claim 12, wherein the second functional entity meeting the conditions for leaving the FL group comprises one or more of the following situations:

the second functional entity no longer supports the application or service corresponding to the FL group;

the second functional entity no longer serves the data network, the network slice or the area corresponding to the FL group;

the second functional entity no longer accesses the data network or the network slice corresponding to the FL group; and the second functional entity leaves the area corresponding to the FL group.

17. A functional entity, wherein the functional entity is a second functional entity and comprising a memory, a transceiver and a processor; wherein the memory is configured to store computer programs; the transceiver is configured to send and receive data under a control of the processor; the processor is configured to read the computer programs in the memory to perform the federated learning group processing method according to claim 12.

* * * * *